United States Patent
Heubel

(10) Patent No.: US 9,891,709 B2
(45) Date of Patent: Feb. 13, 2018

(54) SYSTEMS AND METHODS FOR CONTENT- AND CONTEXT SPECIFIC HAPTIC EFFECTS USING PREDEFINED HAPTIC EFFECTS

(75) Inventor: Robert Heubel, San Leandro, CA (US)

(73) Assignee: Immersion Corporation, San Jose, CA (US)

( * ) Notice: Subject to any disclaimer, the term of this patent is extended or adjusted under 35 U.S.C. 154(b) by 242 days.

(21) Appl. No.: 13/473,050

(22) Filed: May 16, 2012

(65) Prior Publication Data

US 2013/0307786 A1 Nov. 21, 2013

(51) Int. Cl.
G06F 3/041 (2006.01)
G06F 3/01 (2006.01)
G08B 6/00 (2006.01)

(52) U.S. Cl.
CPC .............. *G06F 3/016* (2013.01); *G08B 6/00* (2013.01)

(58) Field of Classification Search
CPC . G08B 6/00; G06F 3/041; G06F 3/016; G06F 3/04812; G05B 2219/35149; G05B 2219/40122; G05B 2219/40553; G05B 2219/36455; G05B 2219/37396; G05B 2219/395; A63F 2300/1037; H01H 2003/008; G01C 21/3652; G05G 1/015; Y10S 116/17; Y10S 901/33; Y10S 901/34
USPC ................... 345/159–184; 340/691.1, 691.8
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,902,687 A | 9/1975 | Hiahtower |
| 3,903,614 A | 9/1975 | Diamond et al. |

(Continued)

FOREIGN PATENT DOCUMENTS

| | | |
|---|---|---|
| EP | 0 349 086 | 1/1990 |
| EP | 1 256 871 | 11/2002 |

(Continued)

OTHER PUBLICATIONS

Gotow et al., Controlled Impedance Test Apparatus for Studying Human Interpretation of Kinesthetic Feedback, WA11-11:00, p. 332-337, 1984.

(Continued)

*Primary Examiner* — Vinh Lam

(74) *Attorney, Agent, or Firm* — Kilpatrick Townsend & Stockton LLP

(57) ABSTRACT

Systems and methods for content- and/or context-specific haptic effects are disclosed. In one embodiment electronic content is received by an electronic device. A plurality of predefined effects are received. The plurality of predefined effects may be a database of predefined haptic effects, a library of predefined haptic effects, or a list of predefined haptic effects. An association between at least one predefined haptic effect from the plurality of predefined haptic effects and a predefined event is received. An occurrence of the predefined event is identified wherein the occurrence of the predefined event is associated with a portion of the electronic content. In response to identifying the occurrence of the event, the predefined haptic effect can be generated.

37 Claims, 5 Drawing Sheets

(56) References Cited

U.S. PATENT DOCUMENTS

| | | |
|---|---|---|
| 3,911,416 A | 10/1975 | Feder |
| 4,160,508 A | 7/1979 | Salsbury |
| 4,236,325 A | 10/1980 | Hall et al. |
| 4,262,549 A | 4/1981 | Schwellenbach |
| 4,311,980 A | 1/1982 | Prudenziati |
| 4,333,070 A | 6/1982 | Bames |
| 4,362,408 A | 12/1982 | Cordes et al. |
| 4,464,117 A | 8/1984 | Forest |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,692,756 A | 9/1987 | Clark |
| 4,708,656 A | 11/1987 | De Vries et al. |
| 4,712,889 A | 12/1987 | Schindl |
| 4,713,007 A | 12/1987 | Alban |
| 4,725,817 A | 2/1988 | Wihlborg |
| 4,791,416 A | 12/1988 | Adler |
| 4,794,392 A | 12/1988 | Selinko |
| 4,795,296 A | 1/1989 | Jau |
| 4,798,919 A | 1/1989 | Miessler et al. |
| 4,821,030 A | 4/1989 | Batson et al. |
| 4,823,106 A | 4/1989 | Lovell |
| 4,840,634 A | 6/1989 | Muller et al. |
| 4,885,565 A | 12/1989 | Embach |
| 4,891,764 A | 1/1990 | Mcintosh |
| 4,930,770 A | 6/1990 | Baker |
| 4,934,694 A | 6/1990 | Mcintosh |
| 4,982,918 A | 1/1991 | Kaye |
| 4,983,786 A | 1/1991 | Stevens |
| 5,019,761 A | 5/1991 | Kraft |
| 5,022,384 A | 6/1991 | Freels |
| 5,022,407 A | 6/1991 | Horch et al. |
| 5,035,242 A | 7/1991 | Franklin |
| 5,038,089 A | 8/1991 | Szakaly |
| 5,053,585 A | 10/1991 | Yaniger |
| 5,078,152 A | 1/1992 | Bond |
| 5,116,051 A | 5/1992 | Moncrief et al. |
| 5,165,897 A | 11/1992 | Johnson |
| 5,175,459 A | 12/1992 | Danial et al. |
| 5,182,557 A | 1/1993 | Lang |
| 5,186,685 A | 2/1993 | Mangseth et al. |
| 5,189,242 A | 2/1993 | Usa |
| 5,212,473 A | 5/1993 | Louis |
| 5,223,658 A | 6/1993 | Suzuki |
| 5,237,327 A | 8/1993 | Saitoh et al. |
| 5,240,417 A | 8/1993 | Smithson et al. |
| 5,241,308 A | 8/1993 | Young |
| 5,246,316 A | 9/1993 | Smith |
| 5,271,290 A | 12/1993 | Fischer |
| 5,275,174 A | 1/1994 | Cook |
| 5,283,970 A | 2/1994 | Aigner |
| 5,289,273 A | 2/1994 | Lang |
| 5,299,810 A | 4/1994 | Pierce |
| 5,309,140 A | 5/1994 | Everett |
| 5,334,027 A | 8/1994 | Whertock |
| 5,355,148 A | 10/1994 | Anderson |
| 5,390,128 A | 2/1995 | Ryan et al. |
| 5,390,296 A | 2/1995 | Crandall et al. |
| 5,402,499 A | 3/1995 | Robison et al. |
| 5,402,680 A | 4/1995 | Korenaga |
| 5,436,622 A | 7/1995 | Gutman et al. |
| 5,437,607 A | 8/1995 | Taylor |
| 5,451,924 A | 9/1995 | Massimino et al. |
| 5,461,711 A | 10/1995 | Wang et al. |
| 5,466,213 A | 11/1995 | Hogan |
| 5,489,812 A | 2/1996 | Furuhata et al. |
| 5,496,175 A | 3/1996 | Oyama et al. |
| 5,514,150 A | 5/1996 | Rostoker |
| 5,521,336 A | 5/1996 | Buchanan et al. |
| 5,547,382 A | 8/1996 | Yamasaki |
| 5,575,761 A | 11/1996 | Hajianpour |
| 5,631,861 A | 5/1997 | Kramer |
| 5,684,722 A | 11/1997 | Thomer et al. |
| 5,691,747 A | 11/1997 | Amano |
| 5,709,219 A | 1/1998 | Chen et al. |
| 5,729,249 A | 3/1998 | Yasutake |
| 5,766,016 A | 6/1998 | Sinclair |
| 5,767,457 A | 6/1998 | Sinclair et al. |
| 5,785,630 A | 7/1998 | Bobick et al. |
| 5,791,992 A | 8/1998 | Crump et al. |
| 5,844,392 A | 12/1998 | Peurach et al. |
| 5,857,986 A | 1/1999 | Moriyasu |
| 5,887,995 A | 3/1999 | Holehan |
| 5,889,670 A | 3/1999 | Schuler et al. |
| 5,889,672 A | 3/1999 | Schuler et al. |
| 5,917,906 A | 6/1999 | Thornton |
| 5,945,772 A | 8/1999 | Macnak et al. |
| 5,977,867 A | 11/1999 | Blouin |
| 5,988,902 A | 11/1999 | Holehan |
| 6,059,506 A | 5/2000 | Kramer |
| 6,078,126 A | 6/2000 | Rollins et al. |
| 6,097,964 A | 8/2000 | Nuovo et al. |
| 6,111,577 A | 8/2000 | Zilles et al. |
| 6,118,435 A | 9/2000 | Fujita et al. |
| 6,131,097 A | 10/2000 | Peurach et al. |
| 6,160,489 A | 12/2000 | Perry et al. |
| 6,195,592 B1 | 2/2001 | Schuler et al. |
| 6,198,206 B1 | 3/2001 | Saarmaa et al. |
| 6,218,966 B1 | 4/2001 | Goodwin et al. |
| 6,219,034 B1 | 4/2001 | Elbing et al. |
| 6,225,976 B1 | 5/2001 | Yates et al. |
| 6,292,173 B1 | 9/2001 | Rambaldi et al. |
| 6,307,465 B1 | 10/2001 | Kayama et al. |
| 6,344,791 B1 | 2/2002 | Armstrong |
| 6,369,803 B2 | 4/2002 | Brisebois et al. |
| 6,373,463 B1 | 4/2002 | Beeks |
| 6,374,255 B1 | 4/2002 | Peurach et al. |
| 6,388,655 B1 | 5/2002 | Leung |
| 6,422,941 B1 | 7/2002 | Thorner et al. |
| 6,429,846 B2 | 8/2002 | Rosenberg et al. |
| 6,543,487 B2 | 4/2003 | Bazinet |
| 6,597,347 B1 | 7/2003 | Yasutake |
| 6,657,617 B2 | 12/2003 | Paolini et al. |
| 6,781,569 B1 | 8/2004 | Gregorio et al. |
| 6,801,191 B2 | 10/2004 | Mukai et al. |
| 6,976,562 B1 | 12/2005 | Perret, Jr. et al. |
| 7,159,008 B1* | 1/2007 | Wies .................. G06F 3/01 |
| | | 709/203 |
| 7,757,171 B1 | 7/2010 | Wong et al. |
| 2002/0033795 A1 | 3/2002 | Shahoian et al. |
| 2002/0128048 A1 | 9/2002 | Aaltonen et al. |
| 2002/0149561 A1 | 10/2002 | Fukumoto |
| 2002/0171621 A1 | 11/2002 | Johnson |
| 2002/0177471 A1 | 11/2002 | Kaaresoja et al. |
| 2003/0068053 A1 | 4/2003 | Chu |
| 2004/0130526 A1 | 7/2004 | Rosenberg |
| 2004/0161118 A1 | 8/2004 | Chu |
| 2005/0099393 A1 | 5/2005 | Johnson |
| 2006/0066569 A1 | 3/2006 | Eid et al. |
| 2007/0176742 A1* | 8/2007 | Hofmann .......... H04M 19/04 |
| | | 340/7.6 |
| 2007/0254627 A1* | 11/2007 | Kikuchi ......... H04M 1/72572 |
| | | 455/404.2 |
| 2008/0098331 A1 | 4/2008 | Novick et al. |
| 2008/0122796 A1* | 5/2008 | Jobs .................. G06F 3/0488 |
| | | 345/173 |
| 2008/0165081 A1 | 7/2008 | Lawther et al. |
| 2008/0287147 A1 | 11/2008 | Grant et al. |
| 2009/0021473 A1* | 1/2009 | Grant .................. G06F 3/016 |
| | | 345/156 |
| 2009/0083281 A1 | 3/2009 | Sang et al. |
| 2009/0096632 A1 | 4/2009 | Ullrich et al. |
| 2009/0231276 A1 | 9/2009 | Ullrich et al. |
| 2009/0325645 A1* | 12/2009 | Bang .................. G06F 3/016 |
| | | 455/566 |
| 2009/0327894 A1 | 12/2009 | Rakib et al. |
| 2010/0148942 A1* | 6/2010 | Oh .................. G10L 21/06 |
| | | 340/407.1 |

(56) References Cited

U.S. PATENT DOCUMENTS

| | | | |
|---|---|---|---|
| 2010/0207871 A1* | 8/2010 | Reponen | G06F 1/1626 345/156 |
| 2010/0231539 A1* | 9/2010 | Cruz-Hernandez | G06F 3/016 345/173 |
| 2011/0153768 A1 | 6/2011 | Carter et al. | |
| 2011/0264491 A1 | 10/2011 | Birnbaum et al. | |
| 2011/0285637 A1* | 11/2011 | Karkkainen | G06F 3/016 345/173 |
| 2012/0023411 A1 | 1/2012 | Ryu et al. | |
| 2012/0139844 A1* | 6/2012 | Ramstein | G06F 3/016 345/173 |
| 2012/0206390 A1* | 8/2012 | Ueno | G06F 3/016 345/173 |
| 2012/0220348 A1* | 8/2012 | Tsukuda | H04M 19/047 455/567 |
| 2012/0286944 A1* | 11/2012 | Forutanpour | G06F 3/016 340/407.1 |
| 2012/0299859 A1* | 11/2012 | Kinoshita | G06F 3/016 345/173 |
| 2012/0327006 A1* | 12/2012 | Israr | G06F 3/016 345/173 |
| 2013/0044065 A1* | 2/2013 | Lee | H04M 1/03 345/173 |
| 2013/0076686 A1* | 3/2013 | Kono | G06F 3/0416 345/173 |
| 2013/0086178 A1 | 4/2013 | Osborne et al. | |
| 2013/0181913 A1* | 7/2013 | Cole | G06F 3/016 345/173 |
| 2013/0207904 A1* | 8/2013 | Short | G06F 3/016 345/173 |
| 2013/0207918 A1* | 8/2013 | Kono | G06F 3/016 345/173 |
| 2013/0222311 A1* | 8/2013 | Pesonen | G06F 3/016 345/173 |
| 2013/0246222 A1* | 9/2013 | Weerasinghe | G06Q 30/02 705/26.62 |
| 2013/0278536 A1* | 10/2013 | Nakamura | G06F 3/016 345/173 |
| 2013/0335333 A1* | 12/2013 | Kukulski | G06F 3/04845 345/173 |
| 2014/0015773 A1* | 1/2014 | Loeffler | G06F 3/016 345/173 |
| 2015/0234464 A1* | 8/2015 | Yliaho | G06F 3/016 345/473 |

FOREIGN PATENT DOCUMENTS

| | | |
|---|---|---|
| EP | 1 921 836 | 5/2008 |
| EP | 1 936 929 | 6/2008 |
| GB | 2 348 082 | 9/2000 |
| GB | 2 376 610 | 12/2002 |
| JP | H2-185278 | 7/1990 |
| JP | H4-8381 | 1/1992 |
| JP | H5-192449 | 8/1993 |
| JP | H7-24147 | 1/1995 |
| JP | 2001-350592 | 12/2001 |
| JP | 2002-259059 | 9/2002 |
| JP | 2005-092441 | 4/2005 |
| WO | WO 1995/020787 | 8/1995 |
| WO | WO 1997/018546 | 5/1997 |
| WO | WO 1999/040504 | 8/1999 |
| WO | WO 2000/10099 | 2/2000 |
| WO | WO 2002/027645 | 4/2002 |
| WO | WO 2002/031807 | 4/2002 |
| WO | WO 2001/019110 | 11/2002 |
| WO | WO 2002/091160 | 11/2002 |
| WO | WO 2004/114700 | 12/2004 |
| WO | WO 2005/036310 | 4/2005 |
| WO | WO 2006/026165 | 3/2006 |
| WO | WO 2006/034952 | 4/2006 |
| WO | WO 2006/036853 | 4/2006 |
| WO | WO 2007/035827 | 3/2007 |
| WO | WO 2008/086319 | 7/2008 |

OTHER PUBLICATIONS

Kaczmarek et al., Tactile Displays, Virtual Environment Technologies, 1995.
Snow et al., Model-X Force-Reflecting-Hand-Controller, NT Control No. MP0-17851: JPL Case No. 5348, p. 1-4, 06-1511989, 1989.
Adelstein, "Design and Implementation of a Force Reflecting Manipulandum for Manual Control research," DSC-vol. 42, Advances in Robotics, Edited by H. Kazerooni, pp. 1-12, 1992.
Adelstein. "A Virtual Environment System for the Study of Human Arm Tremor," Ph.D. Dissertation, Dept. of Mechanical Engineering, MIT, Jun. 1989.
Aukstakalnis et al., "Silicon Mirage: The Art and Science of Virtual Reality," ISBN 0-938151-82-7, pp. 129-180, 1992.
Baigrie, "Electric Control Loading—A Low Cost, High Performance Alternative," Proceedings, pp. 247-254, Nov. 6-8, 1990.
Bejczy et al., "A Laboratory Breadboard System for Dual-Arm Teleoperation," SOAR '89 Workshop, JSC, Houston, TX, Jul. 25-27, 1989.
Bejczy et al., "Kinesthetic Coupling Between Operator and Remote Manipulator," International Computer Technology Conference, The American Society of Mechanical Engineers, San Francisco, CA, Aug. 12-15, 1980.
Bejczy, "Generalization of Bilateral Force-Reflecting Control of Manipulators," Proceedings of Fourth CISM- IFToMM, Sep. 8-12, 1981.
Bejczy, "Sensors, Controls, and Man-Machine Interface for Advanced Teleoperation," Science, vol. 208, No. 4450, pp. 1327-1335, 1980.
Bejczy, et al., "Universal Computer Control System (UCCS) for Space Telerobots," CH2413-3-87-0000-0318501.00 1987 IEEE, 1987.
Bliss, "Optical-to-Tactile Image Conversion for theBlind," IEEE Transactions on Man-Machine Systems, vol. MMS-11, No. 1, Mar. 1970.
Brooks et al., "Hand Controllers for Teleoperation-A State-of-the-Art Technology Survey and Evaluation," JPL Publication 85-11; NASA-CR-175890; N85-28559, pp. 1-84, Mar. 1, 1985.
Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, 05-0211993.
"Cyberman Technical Specification," Logitech Cyberman SWIFT Supplement, Apr. 5, 1994.
Cadler, "Design of a Force-Feedback Touch-Introducing Actuator for Teleoperator Robot Control," Bachelor of Science Thesis, MIT, Jun. 23, 1983.
Caldwell et al., "Enhanced Tactile Feedback (Tele-Taction) Using a Multi-Functional Sensory System," 1050-4729-93, pp. 955-960, 1993.
Eberhardt et al., "Including Dynamic Haptic Perception by The Hand: System Description and Some Results," DSC-vol. 55-1, Dynamic Systems and Control: vol. 1, ASME 1994.
Eberhardt et al., "OMAR • A Haptic display for speech perception by deaf and deaf-blind individuals," IEEE Virtual Reality Annual International Symposium, Seattle, WA, Sep. 18-22, 1993.
Fokumoto, "Active Click: Tactile Feedback for Touch Panels," ACM CHI2001 Extended Abstracts, pp. 121-122, Apr. 2001.
Gobel et al., "Tactile Feedback Applied to Computer Mice," International Journal of Human-Computer Interaction, vol. 7, No. 1, pp. 1-24, 1995.
Gotow et at, "Controlled Impedance Test Apparatus for Studying Human Interpretation of Kinesthetic Feedback," WA11-11:00, pp. 332-337.
Howe, "A Force-Reflecting Teleoperated Hand System for the Study of Tactile Sensing in Precision Manipulation," Proceedings of the 1992 IEEE International Conference on Robotics and Automation, Nice, France, May 1992.
IBM Technical Disclosure Bulletin, "Mouse Ball-Actuating Device With Force and Tactile Feedback," vol. 32, No. 9B, Feb. 1990.
Iwata, "Pen-based Haptic Virtual Environment," 0-7803-1363-1/93 IEEE, pp. 287-292, 1993.

(56) References Cited

OTHER PUBLICATIONS

Jacobsen et al., "High Performance, Dextrous Telerobotic Manipulator With Force Reflection," Intervention-ROV '91 Conference & Exposition, Hollywood, Florida, May 21-23, 1991.
Johnson, "Shape-Memory Alloy Tactile Feedback Actuator," Armstrong Aerospace Medical Research Laboratory. AAMRL•TR-90-039, Aug. 1990.
Jones et al., "A perceptual analysis of stiffness," ISSN 0014-4819 Springer International (Springer-Verlag); Experimental Brain Research, vol. 79, No. 1, pp. 150-156, 1990.
Kaczmarek et al., "Tactile Displays," Virtual Environment Technologies.
Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.
Kontarinis et al., "Tactile Display of Vibratory Information in Teleoperation and Virtual Environments," Presence, 4(4):387-402, 1995.
Marcus, "Touch Feedback in Surgery," Proceedings of Virtual Reality and Medicine The Cutting Edge, Sep. 8-11, 1994.
Ouh-Young, "Force Display in Molecular Docking," Order No. 9034744, p. 1-369, 1990.
Lake, •Cyberman from Logitech, GameBytes. 1994.
McAffee, "Teleoperator Subsystem-Telerobot Demonstrator: Force Reflecting Hand Controller Equipment Manual," JPL D-5172, pp. 1-50, A1-A36, B1-B5. C1-C36, Jan. 1988.
Minsky, "Computational Haptics: The Sandpaper System for Synthesizing Texture for a Force-Feedback Display," Ph.D. Dissertation, MIT, Jun. 1995.
Ouh-Young et al., "The Development of a Low-Cost Force Feedback Joystick and Its Use in the Virtual Reality Environment," Proceedings of the Third Pacific Conference on Computer Graphics and Applications. Pacific Graphics '95, Seoul, Korea, Aug. 21-24, 1995.
Ouh-Young. "A Low-Cost Force Feedback Joystick and Its Use in PC Video Games," IEEE Transactions on Consumer Electronics, vol. 41, No. 3, Aug. 1995.
Patrick et al., "Design and Testing of a Non-reactive, Fingertip, Tactile Display for Interaction with Remote Environments," Cooperative Intelligent Robotics in Space. Rui J. deFigueiredo et al., Editor. Proc. SPIE vol. 1387, pp. 215-222 1990.
Pimentel et al., Virtual Reality: through the new looking glass, $2^{nd}$ Edition; McGraw-Hill, ISBN 0-07-050167-X, pp. 41-202, 1994.
Rabinowitz et al., "Multidimensional tactile displays: Identification of vibratory intensity, frequency and contactor area," Journal of The Acoustical Society of America, vol. 82, No. 4, Oct. 1987.
Russo, "Controlling Dissipative Magnetic Particle Brakes in Force Reflective Devices," DSC-vol. 42, Advances in Robotics. pp. 63-70, ASME 1992.
Russo, "The Design and Implementation of a Three Degree of Freedom Force Output Joystick," MIT Libraries Archives Aug. 14, 1990, pp. 1-131, May 1990.
Scannell, "Taking a Joystick Ride," Computer Currents. Boston Edition, vol. 9, No. 11, Nov. 1994.
Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.
Snow et al, "Model-X Force-Reflecting-Hand-Controller," NT Control No. MP0-17851; JPL Case No. 5348, pp. 1-4, 06-1511989.
Stanley et al., "Computer Simulation of Interacting Dynamic Mechanical Systems Using Distributed Memory Parallel Processors," DSC-vol. 42, Advances in Robotics, pp. 55-61, ASME 1992.
Tadros, Control System Design for a Three Degree of Freedom Virtual Environment Simulator Using Motor-Brake Fair Actuators, MIT Archive© Massachusetts Institute of Technology, pp. 1-88, Feb. 1990.
Terry et al., "Tactile Feedback in a Computer Mouse." Proceedings of Fourteenth Annual Northeast Bioengineering Conference, University of New Hampshire, Mar. 10-11, 1988.
SMK Corporation, "Force Feedback Type Optical Touch Panel Developed," SMK Corporation Website, Oct. 30, 2002.
SMK Corporation, "Multi-Functional Touch Panel, Force-Feedback Type, Developed: A Touch Panel Providing a Clicking Feeling," http:--www.smk.co.jp-whatsnew_e-628csc_e.html, Sep. 30, 2002.
Wakiwaka, et al., "Influence of Mover Support Structure on Linear Oscillatory Actuator for Cellular Phones," The Third International Symposium on Linear Drives for Industry Applications, 2001, p. 260-263, Nagano, Japan.
Wiker. "Teletouch Display Development: Phase 1 Report," Technical Report 1230, Naval Ocean Systems Center. San Diego, Apr. 17, 1989.

* cited by examiner

SYSTEMS AND METHODS FOR CONTENT- AND CONTEXT SPECIFIC HAPTIC EFFECTS USING PREDEFINED HAPTIC EFFECTS

FIELD OF THE INVENTION

The present disclosure relates generally to systems and methods for content- and context-specific haptic effects.

BACKGROUND

With the increase in popularity of handheld devices, especially mobile phones having touch-sensitive surfaces (e.g., touch screens), physical tactile sensations which have traditionally been provided by mechanical buttons are no longer present in many such devices. Instead, haptic effects may be output by handheld devices to alert the user to various events. Such haptic effects may include vibrations to indicate a button press, an incoming call, or a text message, or to indicate error conditions.

SUMMARY

Embodiments of the present invention provide systems and methods for content- and/or context-specific haptic effects. For example, one disclosed method comprises receiving, by an electronic device, electronic content; receiving, by the electronic device, a plurality of predefined haptic effects; receiving, by the electronic device, an association between at least one predefined haptic effect from the plurality of predefined haptic effects and a predefined event; identifying, by the electronic device, an occurrence of the predefined event, the occurrence of the predefined event associated with a portion of the electronic content; and in response to identifying the occurrence of the predefined event, generating, by the electronic device, the predefined haptic effect. In another embodiment, a computer readable medium comprises program code for causing a processor to perform such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for content- and/or context-specific haptic effects. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Method

In an illustrative method, an eReader receives a database containing a plurality of predefined haptic effects, a plurality of predefined events, and associations between the predefined haptic effects and the predefined events. When a user of the eReader purchases an eBook, the eReader receives the eBook. As the user reads through the eBook on the eReader, the eReader determines whether one or more of the predefined events occurs within a portion of the eBook that the reader is currently reading. For example, as the eReader transitions from one page of the eBook to a new page of the eBook, the eReader analyzes the content on the new page of the eBook to determine whether one or more of the predefined events occurs on that page of the eBook. If the eReader determines that a predefined event occurs on the new page, then the eReader outputs the predefined haptic effect(s) associated with the predefined event. If the user later purchases another eBook, then the eReader uses the previously-received database to determine occurrences of the predefined events and to output the associated predefined haptic effect(s). Thus, the database of predefined haptic effects, predefined events, and associations between the predefined haptic effects and predefined events received by the eReader can be used for any number of eBooks.

This illustrative example is given to introduce the reader to the general subject matter discussed herein. The invention is not limited to this example. The following sections describe various additional non-limiting embodiments and examples of devices, systems, and methods for content- and/or context-specific haptic effects.

Illustrative Device & Embodiment

Figure 1:
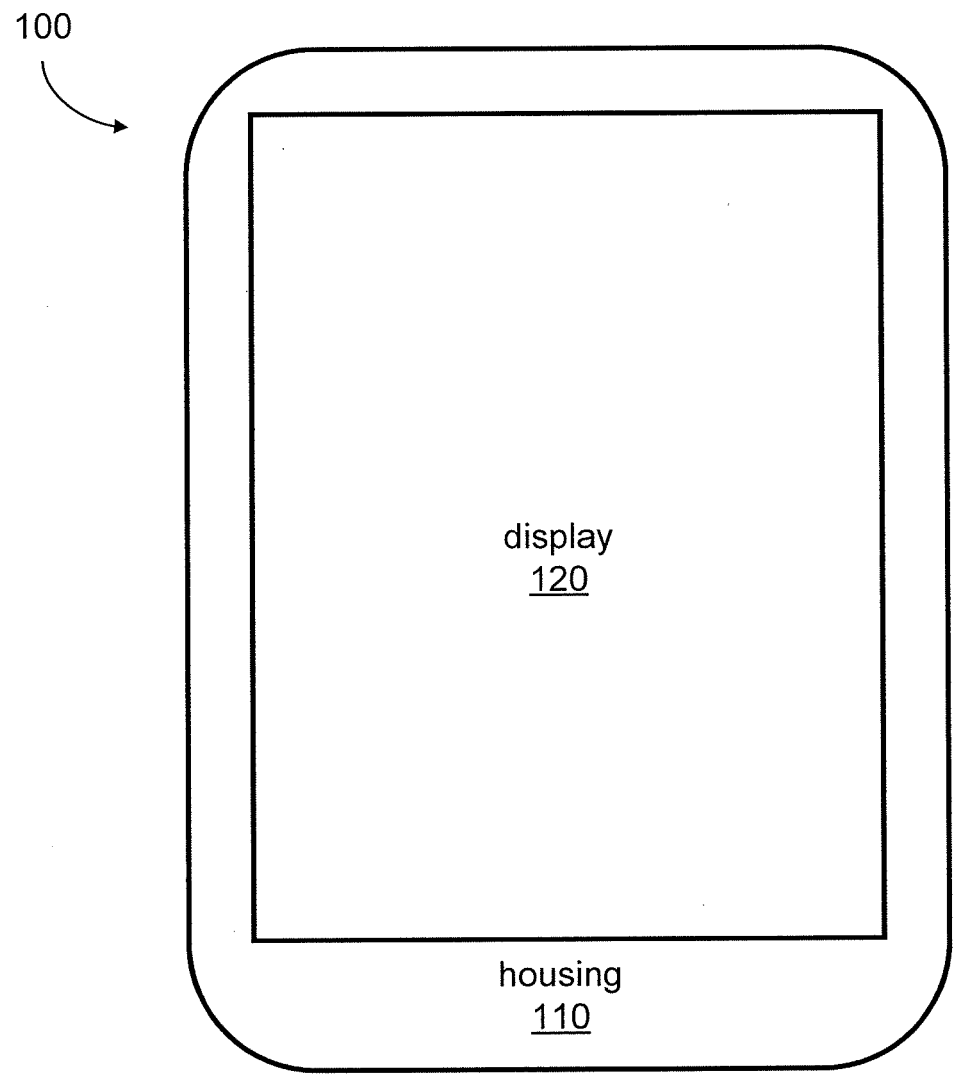
FIG. 1 illustrates an electronic device for content- and/or context-specific haptic effects in accordance with an illustrative embodiment of the present invention.

Referring to FIG. 1, this figure illustrates an illustrative electronic device 100 for content- and/or context-specific haptic effects. In this illustrative embodiment, the electronic device 100 receives electronic content such as an eBook. The electronic device 100 also receives a plurality of predefined haptic effects, which may be embedded within the electronic content, referenced by the electronic content, or received independently from the electronic content. The plurality of predefined haptic effects may be a database of predefined haptic effects, a library of predefined haptic effects, and/or a list of predefined haptic effects. The electronic device 100 also receives a plurality of predefined events, which may be embedded within the electronic content or the plurality of predefined haptic effects, referenced by the electronic content or the plurality of predefined haptic effects, or received independently from the electronic content or the plurality of predefined haptic effects. Each predefined event is associated with at least one predefined haptic effect from the plurality of predefined haptic effects. For example, a predefined event can be the word "rain" being displayed on a display and the predefined event may be associated with a predefined haptic effect from the plurality of predefined haptic effects that is configured to provide a "raining" haptic effect.

The electronic device 100 then identifies an occurrence of the predefined event by analyzing at least a portion of the electronic content. In response to identifying the occurrence of the predefined event, the predefined haptic effect or haptic effects associated with the predefined event can be generated. For example, as the user navigates through the pages of an eBook, such as by pressing buttons corresponding to the "Previous Page" or "Next Page" of the eBook or by making gestures on the touch-sensitive display 120, the display 120 is updated to display pages of the eBook. In this illustrative embodiment, when a new page of the eBook is displayed on the display 120, the electronic device 100 analyzes the text of the page displayed on the display 120 to determine whether the predefined event has occurred. For example, an occurrence of the predefined event discussed above may be determined to occur when the text of the page, or portion of the page, displayed on the display 120 contains a particular word—"rain".

In this embodiment, the word "rain" is associated with a predefined haptic effect from the plurality of predefined haptic effects that is configured to provide a "raining" sensation. In response to identifying the word "rain" within the text of the page of the eBook currently being shown on the display 120, the electronic device 100 generates the predefined haptic associated with the "rain" effect. In this embodiment, the electronic device 100 generates a signal configured to cause the predefined "raining" haptic effect and outputs the generated signal to a haptic output device associated with the electronic device 100. Thus, in this embodiment, a user of the electronic device 100 feels a "raining" sensation when a page of the eBook containing the word "rain" is displayed on the display 120. Furthermore, because in embodiments the predefined haptic effects and/or the predefined events are content agnostic with respect to a particular piece of electronic content (e.g., a particular book), the electronic device 100 can determine occurrences of predefined events associated with predefined haptic effects across multiple pieces of electronic content. For example, the electronic device 100 may determine whether occurrences of predefined events associated with predefined haptic effects occur on any number of eBooks.

Illustrative Device

Figure 2:
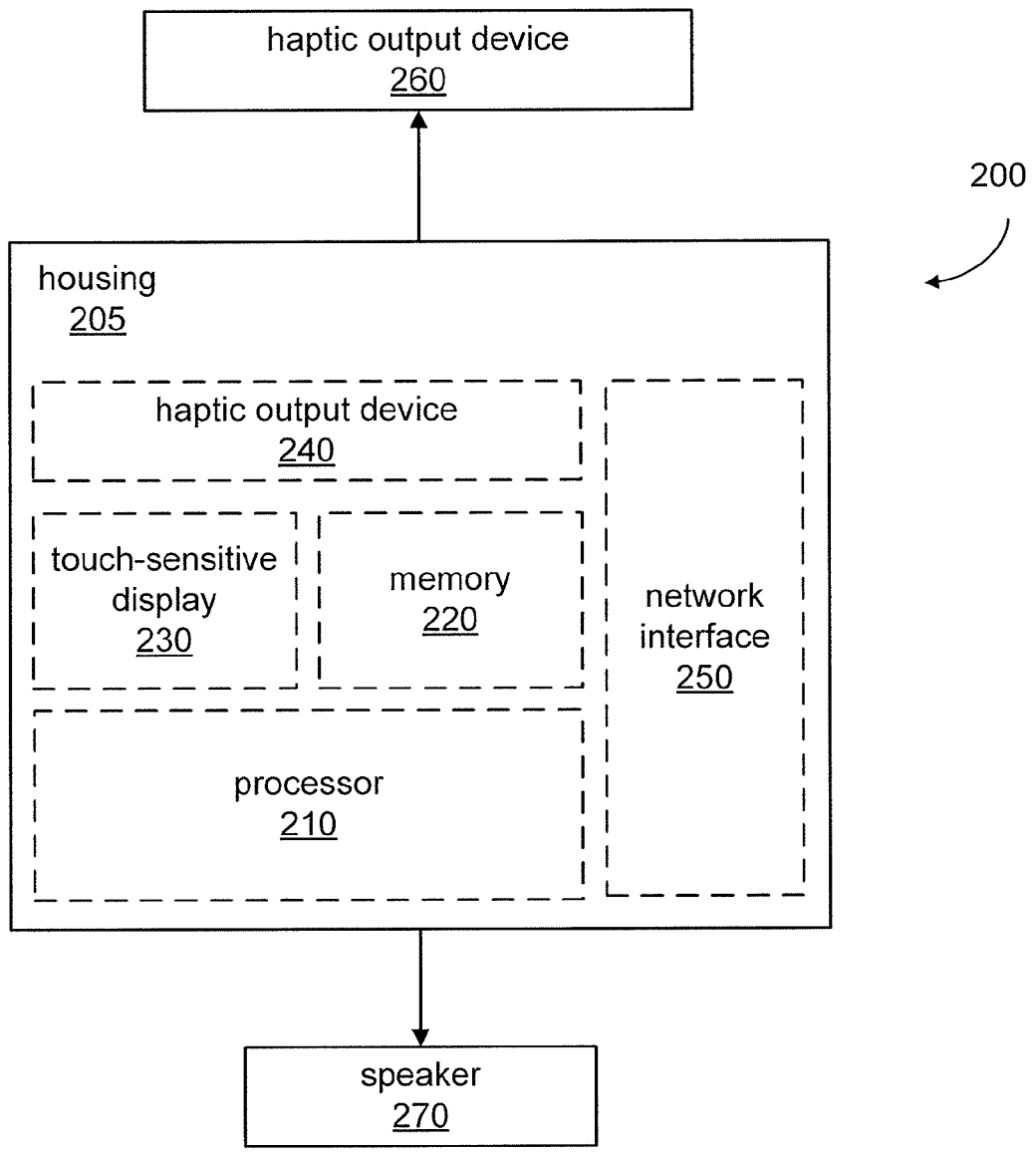
FIG. 2 illustrates an electronic device for content- and/or context-specific haptic effects in accordance with an illustrative embodiment of the present invention.

Referring now to FIG. 2, FIG. 2 illustrates an electronic device 200 for content- and/or context-specific haptic effects according to an embodiment of the present invention. In the embodiment shown in FIG. 2, the electronic device 200 comprises a housing 205, a processor 210, a memory 220, a touch-sensitive display 230, a haptic output device 240, and a network interface 250. The processor 210 is in communication with the memory and, in this embodiment, both the processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the electronic device 200. In some embodiments, the touch-sensitive display 230 may not be disposed within the housing 205. For example, the electronic device 200 may be connected to or otherwise in communication with a touch-sensitive display 230 disposed within a separate housing.

In the embodiment shown in FIG. 2, the touch-sensitive display 230 is in communication with the processor 210 and is configured to provide signals to the processor 210 or the memory 220. The memory 220 stores program code or data, or both, for use by the processor 210 and the processor 210 executes program code stored in memory 220 and receives signals from the touch-sensitive display 230. The processor 210 is also configured to output signals to cause the touch-sensitive display 230 to output images. In the embodiment shown in FIG. 2, the processor 210 is in communication with the network interface 250 and is configured to receive signals from the network interface 250 and to output signals to the network interface 250 to communicate with other components or devices. In addition, the processor 210 is in communication with haptic output device 240 and haptic output device 260 and is further configured to output signals to cause haptic output device 240 or haptic output device 260, or both, to output one or more haptic effects. Furthermore, the processor 210 is in communication with speaker 270 and is configured to output signals to cause speaker 270 to output sounds. In various embodiments, the electronic device 200 may comprise or be in communication with fewer or additional components or devices. For example, other user input devices such as a mouse or a keyboard, or both, may be comprised within the electronic device 200 or be in communication with the electronic device 200. A detailed description of the components of the electronic device 200 shown in FIG. 2 and components that may be in association with the electronic device 200 is described below.

The electronic device 200 can be any device that is capable of receiving user input. For example, the electronic device 200 in FIG. 2 includes a touch-sensitive display 230 that comprises a touch-sensitive surface. In some embodiments, a touch-sensitive surface may be overlaid on the touch-sensitive display 230. In other embodiments, the electronic device 200 may comprise or be in communication with a display and a separate touch-sensitive surface. In still other embodiments, the electronic device 200 may comprise or be in communication with a display and may comprise or be in communication with other user input devices, such as a mouse, a keyboard, buttons, knobs, slider controls, switches, wheels, rollers, other manipulanda, or a combination thereof.

In some embodiments, one or more touch-sensitive surfaces may be included on or disposed within one or more sides of the electronic device 200. For example, in one embodiment, a touch-sensitive surface is disposed within or comprises a rear surface of the electronic device 200. In another embodiment, a first touch-sensitive surface is disposed within or comprises a rear surface of the electronic device 200 and a second touch-sensitive surface is disposed within or comprises a side surface of the electronic device 200. Furthermore, in embodiments where the electronic device 200 comprises at least one touch-sensitive surface on one or more sides of the electronic device 200 or in embodiments where the electronic device 200 is in communication with an external touch-sensitive surface, the display 230 may or may not comprise a touch-sensitive surface. In some embodiments, one or more touch-sensitive surfaces may have a flexible touch-sensitive surface. In other embodiments, one or more touch-sensitive surfaces may be rigid. In various embodiments, the electronic device 200 may comprise both flexible and rigid touch-sensitive surfaces.

In various embodiments, the electronic device 200 may comprise or be in communication with fewer or additional components than the embodiment shown in FIG. 2. For example, in one embodiment, the electronic device 200 is not in communication with speaker 270 and does not comprise haptic output device 240. In another embodiment, the electronic device 200 does not comprise a touch-sensitive display 230 or a network interface 250, but comprises a touch-sensitive surface and is in communication with an external display. In other embodiments, the electronic device 200 may not comprise or be in communication with a haptic output device at all. Thus, in various embodiments, the electronic device 200 may comprise or be in communication with any number of components, such as in the various embodiments disclosed herein as well as variations that would be apparent to one of skill in the art.

The housing 205 of the electronic device 200 shown in FIG. 2 provides protection for at least some of the components electronic device 200. For example, the housing 205 may be a plastic casing that protects the processor 210 and memory 220 from foreign articles such as rain. In some embodiments, the housing 205 protects the components in the housing 205 from damage if the electronic device 200 is dropped by a user. The housing 205 can be made of any suitable material including but not limited to plastics, rubbers, or metals. Various embodiments may comprise different types of housings or a plurality of housings. For example, in some embodiments, the multi-pressure touch-sensitive input electronic device 200 may be an eReader, portable reading device, handheld reading device, cell phone, personal digital assistant (PDA), laptop, tablet computer, desktop computer, digital music player, gaming console, handheld video game system, gamepad, a remote control, a game controller, medical instrument, etc. In other embodiments, the electronic device 200 may be embedded in another device such as, for example, the console of a car.

In the embodiment shown in FIG. 2, the touch-sensitive display 230 provides a mechanism for a user to interact with the electronic device 200. For example, the touch-sensitive display 230 detects the location or pressure, or both, of a user's finger in response to a user hovering over, touching, or pressing the touch-sensitive display 230 (all of which may be referred to as a contact in this disclosure). In one embodiment, a contact can occur through the use of a camera. For example, a camera may be used to track a viewer's eye movements as the reader views the content displayed on the display 230 of the electronic device 200. In this embodiment, haptic effects may be triggered based at least in part on the viewer's eye movements. For example, a haptic effect may be output when a determination is made that the viewer is viewing content at a particular location of the display 230. In some embodiments, the touch-sensitive display 230 may comprise, be connected with, or otherwise be in communication with one or more sensors that determine the location, pressure, a size of a contact patch, or any of these, of one or more contacts on the touch-sensitive display 230. For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on a touch-sensitive surface such as, for example, resistive, capacitive, infrared, optical, thermal, dispersive signal, or acoustic pulse technologies, or a combination thereof.

In the embodiment shown in FIG. 2, haptic output devices 240 and 260 are in communication with the processor 210 and are configured to provide one or more haptic effects. For example, in one embodiment, when an actuation signal is provided to haptic output device 240, haptic output device 260, or both, by the processor 210, the respective haptic output device(s) 240, 260 outputs a haptic effect based on the actuation signal. For example, in the embodiment shown, the processor 210 is configured to transmit a haptic output signal to haptic output device 240 comprising an analog drive signal. However, the processor 210 is configured to transmit a command to haptic output device 260, wherein the command includes parameters to be used to generate an appropriate drive signal to cause the haptic output device 260 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 240 or 260, can be any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass.

In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel.

In FIG. 2, the network interface 250 is in communication with the processor 210 and provides wired or wireless communications, from the electronic device 200 to other components or other devices. For example, the network interface 250 may provide wireless communications between the electronic device 200 and a wireless speaker or a wireless actuation device. In some embodiments, the network interface 250 may provide communications to one or more other devices, such as another electronic device 200, to allow users to interact with each other at their respective devices. The network interface 250 can be any component or collection of components that enables the multi-pressure touch-sensitive input electronic device 200 to communicate with another component or device. For example, the network interface 250 may comprise a PCI network adapter, a USB network adapter, or an Ethernet adapter. The network interface 250 may communicate using wireless Ethernet, including 802.11a, g, b, or n standards. In one embodiment, the network interface 250 can communicate using Bluetooth, CDMA, TDMA, FDMA, GSM, WiFi, or other cellular or wireless technology. In other embodiments, the network interface 250 may communicate through a wired connection and may be in communication with one or more networks, such as Ethernet, token ring, USB, FireWire 1394, fiber optic, etc. And while the embodiment shown in FIG. 2 comprises a network interface 250, other embodiments may not comprise a network interface 250.

Illustrative System

Figure 3:
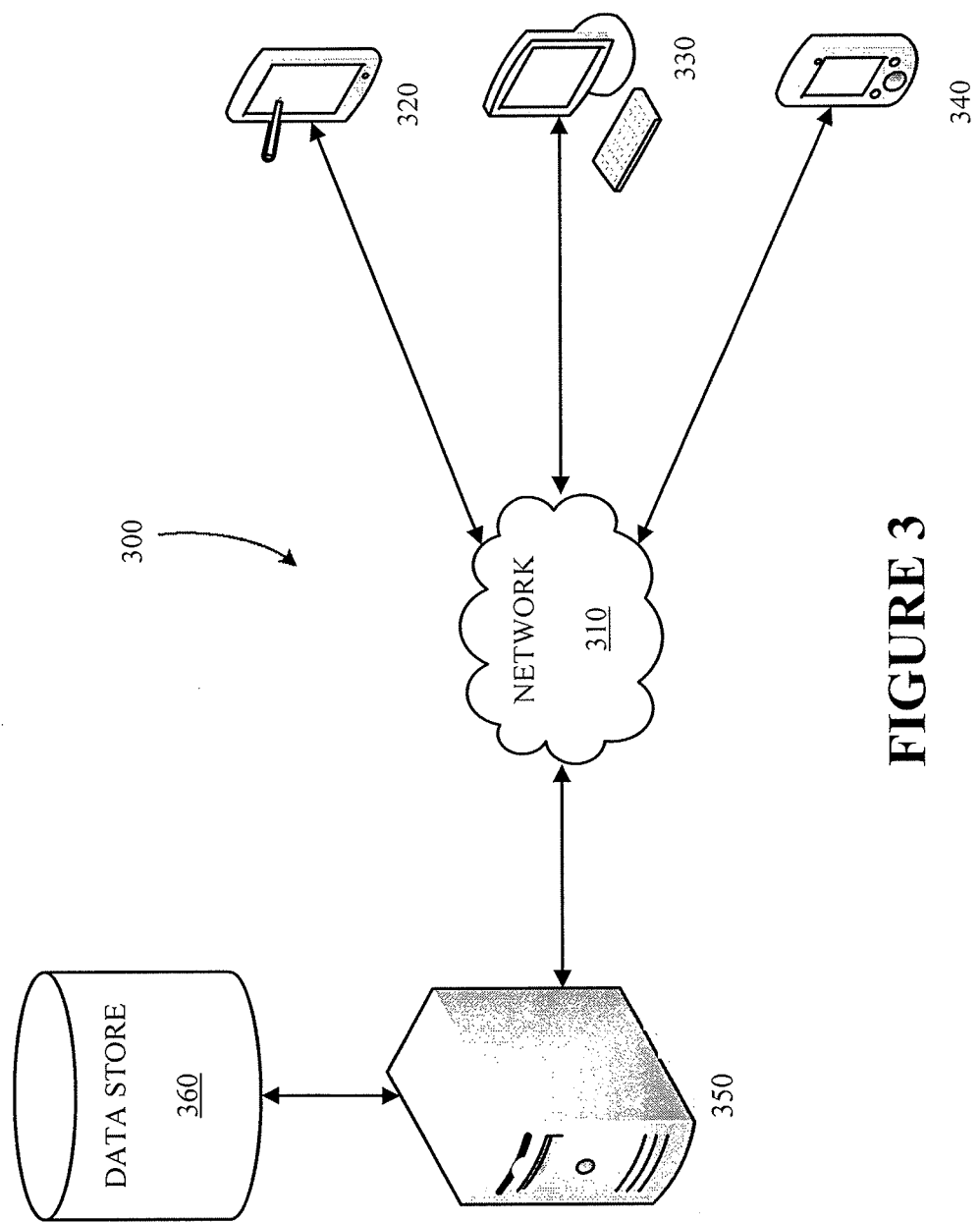
FIG. 3 illustrates a system diagram depicting illustrative computing devices for content or context specific haptic effects in an illustrative computing environment in accordance with an embodiment of the present invention.

Referring now to FIG. 3, this figure illustrates a system diagram depicting illustrative computing devices in an illustrative computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), a cellular network, a WiFi network, the Internet, an intranet or any combination of hard-wired and/or wireless communication links. In one embodiment, the network 310 is a single network. In other embodiments, the network 310 may comprise two or more networks. For example, the electronic devices 320-340 may be connected to a first network and the web server 350 may be connected to a second network and the first and the second network may be connected by a third network. Numerous other network configurations would be obvious to a person of ordinary skill in the art.

An electronic device may be capable of communicating with a network, such as network 310, and capable of sending and receiving information to and from another device, such as web server 350. For example, in FIG. 3, one electronic device 320 is a tablet computer. The tablet computer 320 includes a touch-sensitive display and is able to communicate with the network 310 by using a wireless network interface card. Another device that may be an electronic device 330 shown in FIG. 3 is a desktop computer. The desktop computer 330 is in communication with a display and is able to connect to the network 330 through a wired network connection. The desktop computer 330 may be in communication with any number of input devices such as a keyboard or a mouse. In FIG. 3, a mobile phone is an electronic device 340. The mobile phone 340 may be able to communicate with the network 310 over a wireless communications means using Bluetooth, CDMA, TDMA, FDMA, GSM, WiFi, or other cellular or wireless technology.

A device receiving a request from another device may be any device capable of communicating with a network, such as network 310, and capable of sending and receiving information to and from another device. For example, in the embodiment shown in FIG. 3, the web server 350 may receive a request from another device (e.g., one or more of electronic devices 320-340) and may be in communication with network 310. A receiving device may be in communication with one or more additional devices, such as additional servers. For example, web server 350 in FIG. 3 may be in communication with another server. In an embodiment, a web server may communicate with one or more additional devices to process a request received from a electronic device. For example, web server 350 in FIG. 3 may be in communication with a plurality of additional servers, at least one of which may be used to process at least a portion of a request from any of the electronic devices 320-340. In one embodiment, web server 350 may be part of or in communication with a content distribution network (CDN).

One or more devices may be in communication with a data store. In FIG. 3, web server 350 is in communication with data store 360. In embodiments, data store 360 is operable to receive instructions from web server 350 and/or other devices in communication with data store 360 and obtain, update, or otherwise process data in response to receiving the instructions. In one embodiment, an electronic device, such as tablet computer 320, comprises and/or is in communication with a data store. A data store, such as data store 360, may contain electronic content, such as an eBook or magazine, data items, user accounts, metadata, information associated with predefined haptic effects, information associated with predefined events, associations between predefined haptic effects and predefined events, user interactions, user history, information regarding occurrences of events, information regarding generated predefined haptic effects, or other information.

Data store 360 shown in FIG. 3 can receive requests from web server 350 and send responses to web server 350. For example, web server 350 may request an electronic list of email messages for a particular email account. As another example, web server 350 may request the location of an image from data store 360. In response to receiving a request, data store 160 may send the requested information, such as information related to email messages or images, to the device that made the request. In embodiments, data store 360 can send, receive, add, update, or otherwise manipulate information based at least in part on one or more requests received from another device or network, such as web server 350, network 310, or another network or device in communication with data store 360.

Illustrative Electronic Content

In an embodiment, the electronic content received by an electronic device comprises an electronic document. For example, the electronic content can include a digital book, eBook, eMagazine, Portable Document Format (PDF) file, word processing document such as a DOC or DOCX file, text file, and/or another electronic document. In one embodiment, the electronic content comprises a web-based file. For example, the electronic content can be a web page, such as an HTML or PHP file, a blog, and/or other web-based content.

In embodiments, the electronic content comprises one or more images, audio recordings, video recording, live audio streams, live video streams, or a combination thereof. For example, the electronic content can include electronic image files such as a GIF, JPG, PDF, PSP, PNG, TIFF, BMP, and/or other image files. The electronic content can include electronic audio files such as WAV, M4A, WMA, MP3, MP4, and/or other audio files. In some embodiments, the electronic content includes one or more video files such as FLV, MOV, MPEG, AVI, SWF, and/or other video files. In one embodiment, the electronic content includes a combination of one or more types of files disclosed herein or other electronic files. For example, the electronic content may comprise a web page having text, audio, and video. Numerous other examples are disclosed herein and other variations are within the scope of this disclosure.

The electronic content can be in any number of formats and/or written in any number of languages. For example, in one embodiment, the electronic content comprises a web page written in HTML and JavaScript. In other embodiments, the electronic content is written in one or more of the following languages, including but not limited to: ActionScript, ASP, C, C++, HTML, JAVA, JavaScript, JSON, MXML, PHP, XML, or XSLT. The electronic content may be written in one or more declarative languages, one or more procedural languages, or a combination thereof. In an embodiment, the electronic content comprises one or more text files. In some embodiments, at least a portion of the electronic content comprises a single file while in other embodiments the electronic content comprises two or more files. If the electronic content comprises two or more files, all of the files may have the same file type or one or more of the files can have different file types. In one embodiment, the electronic content may be in an archive or compressed format, such as JAR, ZIP, RAR, ISO, or TAR. In some embodiments, the electronic content may be compiled whereas in other embodiments the electronic content may not be compiled.

In one embodiment, the electronic content includes an electronic list corresponding to a plurality of data items. The electronic list can include a list of blog entries, a list of email messages, a list of contacts, a list of images, another list, or a combination thereof. A data item in the plurality of data items may include information associated with one or more articles and/or article categories. For example, in one embodiment, an electronic list is a list corresponding to a blog having a plurality of blog entries. The electronic list can contain information associated with at least a portion of the plurality of data items. For example, an electronic list corresponding to a plurality of blog entries may contain information such as a name of the blog entry, a date and/or time for the blog entry, one or more keywords associated with the blog entry, and/or the text of the blog entry. In one embodiment, an electronic list contains a partial or "snippet" portion of the body of one or more blog entries which can be obtained from at least a portion of the plurality of data items.

In some embodiments, electronic content contains references to data items rather than the data items themselves. For example, electronic content may comprise a plurality of pointers to data items in another location of memory or located within another device, such as a remote server. In an embodiment, a reference includes information usable by the electronic device to locate and/or retrieve the data item. For example, a reference can be a URL address, an absolute file location, or a relative file location corresponding to one or more data items. Thus, if the electronic content contains three references, then the first reference may provide an absolute location on a hard drive of the electronic device 200 where a first data item is stored, the second reference may provide a relative location in the memory of the electronic device 200 where a second data item is stored, and the third reference may provide a URL where a third data item is stored.

In one embodiment, the electronic content is comprised of a plurality of data structures connected together, each of the data structures corresponding to one entry in a list and comprising a plurality of data elements. For example, each element in a list may comprise an identifier (ID), a data item or a reference to a data item, and/or one or more data elements for storing information about the data item. In an embodiment, a list for use within an eBook application comprises a plurality of nodes, where each node represents one chapter of the eBook and comprises an identifier that can be used to retrieve text for that chapter. In another embodiment, each node represents a page of an eBook and comprises a location in memory where that particular page is stored. Numerous other embodiments are disclosed herein and other variations are within the scope of this disclosure.

In addition to comprising data items and/or references to data items, in some embodiments, the electronic content comprises metadata. For example, electronic content may be comprised of a plurality of data structures connected together, each of the data structures corresponding to one entry in a list and comprising a plurality of data elements. In one such embodiment, each element in a list may comprise an identifier (ID), a data item or a reference to a data item, and one or more data elements for storing metadata about the data item. For example in one embodiment, a list for use within an eReader program may comprise a plurality of nodes, where each node represents one article of a magazine and comprises an article identifier, a pointer to the article, the name of the article, an author of the article, a size of the article, an identifier of one or more images associated with the article, etc. In an embodiment, the node also contains an indication of the priority of the message. In some embodiments, other metadata such as keywords, categories, descriptions, comments, highlighted sections, markings, etc., may be included within the list, one or more data nodes, or otherwise within the electronic content. Numerous other embodiments are disclosed herein and other variations are within the scope of this disclosure.

In some embodiments, all or a portion of the electronic content does not comprise metadata. For example, referring to the example above, in one embodiment a first data item in the list contains metadata and a second data item in the list does not contain metadata. In one embodiment, the list does not comprise metadata. In such an embodiment, the list may comprise references to other data structures having metadata about the data items in the list. In one embodiment, all or a portion of the electronic content may not contain metadata and, as described below, metadata is determined for the electronic content. For example, if the electronic content is an image, then the image may not contain any metadata when received but the image may be analyzed using facial recognition to determine an object in the image and to generate corresponding metadata. Metadata corresponding to the determined object, such as a butterfly, a vehicle, a person, etc., may then be stored in the image. In an embodiment, and as discussed below, at least a portion of the electronic content contains metadata but all or a portion of the electronic content is analyzed to determine whether additional metadata should be associated with the electronic content.

Illustrative Predefined Haptic Effects

In embodiments, a plurality of predefined haptic effects are embedded within one or more images, audio recordings, video recording, live audio streams, live video streams, or a combination thereof. For example, a predefined haptic effect can be embedded within or referenced by an electronic image file such as a GIF, JPG, PDF, PSP, PNG, TIFF, BMP, and/or other image files. A predefined haptic effect may be embedded within or referenced by electronic audio files such as WAV, M4A, WMA, MP3, MP4, and/or other audio files. In some embodiments, a predefined haptic effect is embedded within or referenced by one or more video files such as FLV, MOV, MPEG, AVI, SWF, and/or other video files. Numerous other examples are disclosed herein and other variations are within the scope of this disclosure.

In one embodiment, the electronic device 200 receives a database comprising the plurality of predefined haptic effects. For example, the tablet computer 320 may receive a database of predefined haptic effects from web server 350 through network 310. In another embodiment, the electronic device receives a library of predefined haptic effects that comprises the plurality of predefined haptic effects. For example, an application executing on electronic device 200 may comprise or contain information usable to locate a library of predefined haptic effects stored on a flash drive associated with the electronic device. In this embodiment, the electronic device 200 receives the plurality of predefined haptic effects by retrieving the library of predefined haptic effects. In one embodiment, the electronic device 200 receives a list corresponding to the plurality of predefined haptic effects. For example, an electronic list may be comprised of a plurality of data structures connected together, each of the data structures corresponding to one entry in a list. In this embodiment, each data structure comprises a predefined haptic effect and/or a reference to a predefined haptic effect. In this embodiment, the electronic device 200 can receive the plurality of predefined haptic effects by receiving the list.

In one embodiment, the plurality of predefined haptic effects are received by the electronic device 200 from one or more of a database of predefined haptic effects, a library of predefined haptic effects, and a list of predefined haptic effects.

In an embodiment, a predefined haptic effect received by the electronic device 200 is configured for or otherwise designed to operate with a single type of haptic output device. For example, a predefined haptic effect may be configured to operate with an eccentric rotational mass (ERM) actuator. In one embodiment, a first predefined haptic effect is configured to operate with a first type of haptic output device and a second predefined haptic effect is configured to operate with a second type of haptic output device. The first predefined haptic effect can be the same or a similar haptic effect as the second predefined haptic effect. Alternatively, the first predefined haptic effect may be a different haptic effect than the second predefined haptic effect. For example, a first predefined haptic effect may operate with an electro-polymer (EAP) actuator and a second predefined haptic effect may operate with a linear resonant actuator (LRA). In this embodiment, the first predefined haptic effect and the second predefined haptic effect are configured such that both predefined haptic effects have a similar feel. Thus, a user of the electronic device 200 may have a similar experience regardless of whether the first predefined haptic effect is output to an EAP actuator or the second predefined haptic effect is output to an LRA. In other embodiments, the first predefined haptic effect is configured so that a different haptic effect is experienced with the first predefined haptic effect than with the second predefined haptic effect.

In one embodiment, the electronic device 200 receives information associated with an abstraction layer that can translate one or more predefined haptic effects into a device-specific haptic output device or haptic output devices. For example, an abstraction layer may be included in a database of predefined haptic effects, a library of predefined haptic effects, a list of predefined haptic effects, within one or more predefined haptic effects, and/or within the electronic content. In one embodiment the abstraction layer is received by the electronic device from memory, cache, a storage device, or other hardware which contains the abstraction layer. In one embodiment, the abstraction layer comprises information corresponding to a plurality of haptic output device types. For example, an abstraction layer may contain information for eccentric rotational mass (ERM) actuators, linear resonant actuators (LRAs), piezoelectric actuators, voice coil actuators, electro-active polymer (EAP) actuators, memory shape alloys, pagers, DC motors, AC motors, moving magnet actuators, E-core actuators, smartgels, electrostatic actuators, electrotactile actuators, any other haptic output devices, any other collection of components that perform the functions of a haptic output device, or a combination thereof.

In one embodiment, the abstraction layer can translate a haptic effect to one or more haptic output devices associated with an electronic device. For example, if an electronic device comprises an LRA actuator and an ERM actuator and a predefined haptic effect needs to be output, then the abstraction layer can convert the predefined haptic effect into one or more signals configured to cause the LRA actuator or the ERM actuator to output the predefined haptic effect, or both. In one embodiment, the abstraction layer receives one or more parameters and translates the predefined haptic effect based at least in part on these parameters. For example, if the abstraction layer receives a predefined haptic effect and an intensity value of 8 on a scale of 1 to 10, then the abstraction layer can translate the predefined haptic effect and the intensity value into one or more signals configured to cause the predefined haptic effect at the specified intensity. In one embodiment, the abstraction layer can translate the predefined haptic effect such that the same or a similar haptic effect is output by the electronic device regardless of the type or types of haptic output devices the electronic device comprises or is associated with.

In one embodiment, a predefined event includes a particular word being displayed on a display. For example, in this embodiment, the predefined event may occur whenever a page of an eBook containing the particular word is displayed on the touchscreen display of tablet computer 320. In other embodiments, a predefined event includes a particular phrase, variations of a particular word or phrase, a particular icon, a particular image, a particular object in an image or pre-recorded video or live video stream, a particular sound, a particular emotion, a particular context, or a combination thereof. In one embodiment, a predefined event is based on a textual search or other textual query. For example, a predefined event may include the word "car" and the word "crash" being in the same paragraph of an electronic document and at least one of the two words being displayed on a display. A predefined event may be based on a particular timing. For example, a predefined event can include a particular phrase being displayed on a display for three seconds. In one embodiment, the electronic device 200 receives words, phrases, icons, images, emotions, contexts, etc. and uses this information to determine predefined events. In one embodiment, the electronic device 200 receives a list of words and determines that each word is associated with a predefined event that occurs when the word is displayed on a display. In another embodiment, the electronic device 200 receives the list of words and determines that each word is associated with a predefined event that occurs when the word is removed from being displayed on the display. Numerous additional embodiments are disclosed herein and variations are within the scope of this disclosure.

Illustrative Predefined Events and/or Associations

In one embodiment, a predefined event and/or an association between a predefined event and a predefined haptic effect is sent to the electronic device 200 in response to a request sent by the electronic device 200 to another device, such as web server 350. In another embodiment, a predefined event and/or an association between a predefined event and a predefined haptic effect may be pushed from another device to the electronic device 200. For example, web server 350 may send a predefined event and/or an association between a predefined event and a predefined haptic effect to mobile phone 340 without mobile phone 340 requesting the predefined event and/or an association between a predefined event and a predefined haptic effect from the web server 350. In one embodiment, the processor 210 receives a predefined event and/or an association between a predefined event and a predefined haptic effect stored in memory 220. The processor 210 may receive a predefined event and/or an association between a predefined event and a predefined haptic effect from any number of storage devices (e.g., a hard disk drive, flash drive, cache, memory, and/or a data store), other electronic devices, and/or through a network interface that is in communication with the processor 210. A predefined event and/or an association between a predefined event and a predefined haptic effect can be received by an application, an applet, a plug-in, or a script being executed by the processor 210 on the electronic device 200. In one embodiment, an application being executed on the electronic device 200 comprises a predefined event and/or an association between a predefined event and a predefined haptic effect. In another embodiment, a predefined event and/or an association between a predefined event and a predefined haptic effect is embedded within the one or more hardware components of the electronic device 200 and the processor 210 receives the predefined event and/or an association between a predefined event and a predefined haptic effect from one or more of the hardware components.

In one embodiment, a predefined event and/or an association between a predefined event and a predefined haptic effect is embedded within the electronic content. For example, a predefined event and/or an association between a predefined event and a predefined haptic effect may be embedded within an eBook or another electronic document. In another embodiment, a location for a predefined event and/or an association between a predefined event and a predefined haptic effect is referenced by the electronic content. For example, the electronic content may specify a URL address corresponding to a location where a database containing a predefined event and/or an association between a predefined event and a predefined haptic effect are stored. In this embodiment, the electronic device 200 may send a request to the database requesting a predefined event and/or an association between a predefined event and a predefined haptic effect and receive a predefined event and/or an association between a predefined event and a predefined haptic effect from the database. In various embodiments, a reference includes information usable by the electronic device 200 to locate and/or retrieve a predefined event and/or an association between a predefined event and a predefined haptic effect. The electronic content can comprise references that may be used to retrieve a predefined event and/or an association between a predefined event and a predefined haptic effect. For example, a digital magazine may contain a reference to a first a predefined event and another reference to a second predefined event.

In one embodiment, a predefined event and/or an association between a predefined event and a predefined haptic effect is embedded within one or more of the plurality of predefined haptic effects. For example, a predefined event may comprise the word "crashing" being displayed on a display and the plurality of predefined haptic effects may contain a predefined haptic effect configured to provide a "crashing" sensation. In one embodiment, an association associating the predefined "crashing" haptic effect and the predefined "crashing" event may be embedded within or referenced by the predefined "crashing" haptic effect. In another embodiment, an association associating the predefined "crashing" haptic effect and the predefined "crashing" event is embedded within or referenced by the predefined "crashing" event. Thus, in embodiments, an association between a predefined event and a predefined haptic effect is embedded within the predefined event and/or the predefined haptic effect to which it is associated.

In some embodiments a database, library, list, or other content item comprising or referencing the plurality of predefined haptic effects can also contain information related to one or more associations. For example, a database of predefined haptic effects can also contain associations between the predefined haptic effects and predefined events. In one embodiment, the database may contain the predefined haptic effects. In an embodiment, a location for at least one predefined event and/or at least one association between a predefined haptic effect and a predefined event is referenced by a predefined haptic effect.

In embodiments, a predefined event and/or an association between a predefined event and a predefined haptic effect are embedded within one or more images, audio recordings, video recording, live audio streams, live video streams, or a combination thereof. For example, a predefined event and/or an association between a predefined event and a predefined haptic effect can be embedded within or referenced by an electronic image file such as a GIF, JPG, PDF, PSP, PNG, TIFF, BMP, and/or other image files. A predefined event and/or an association between a predefined event and a predefined haptic effect may be embedded within or referenced by electronic audio files such as WAV, M4A, WMA, MP3, MP4, and/or other audio files. In some embodiments, a predefined event and/or an association between a predefined event and a predefined haptic effect is embedded within or referenced by one or more video files such as FLV, MOV, MPEG, AVI, SWF, and/or other video files. Numerous other examples are disclosed herein and other variations are within the scope of this disclosure.

In one embodiment, the electronic device 200 receives a database comprising a predefined event and/or an association between a predefined event and a predefined haptic effect. For example, the tablet computer 320 may receive a database of a predefined event and/or an association between a predefined event and a predefined haptic effect from web server 350 through network 310.

In another embodiment, the electronic device receives a library of predefined events and/or associations between predefined events and predefined haptic effects. For example, an application executing on electronic device 200 may comprise or contain information usable to locate a library of a predefined event and/or an association between a predefined event and a predefined haptic effect stored on a flash drive associated with the electronic device. In this embodiment, the electronic device 200 receives a predefined event and/or an association between a predefined event and a predefined haptic effect by retrieving the library of a predefined event and/or an association between a predefined event and a predefined haptic effect.

In one embodiment, the electronic device 200 receives a list corresponding to a predefined event and/or an association between a predefined event and a predefined haptic effect. For example, an electronic list may be comprised of data structures connected together, each of the data structures corresponding to one entry in a list. In this embodiment, each data structure comprises a predefined event and/or an association between a predefined event and a predefined haptic effect and/or a reference to a predefined event and/or an association between a predefined event and a predefined haptic effect. In this embodiment, the electronic device 200 can receive a predefined event and/or an association between a predefined event and a predefined haptic effect by receiving the list.

In one embodiment, a predefined event and/or an association between a predefined event and a predefined haptic effect are received by the electronic device 200 from one or more of a database of a predefined event and/or an association between a predefined event and a predefined haptic effect, a library of a predefined event and/or an association between a predefined event and a predefined haptic effect, and a list of a predefined event and/or an association between a predefined event and a predefined haptic effect. Numerous other embodiments are disclosed herein and variations are within the scope of this disclosure.

Illustrative Databases

Figure 4:
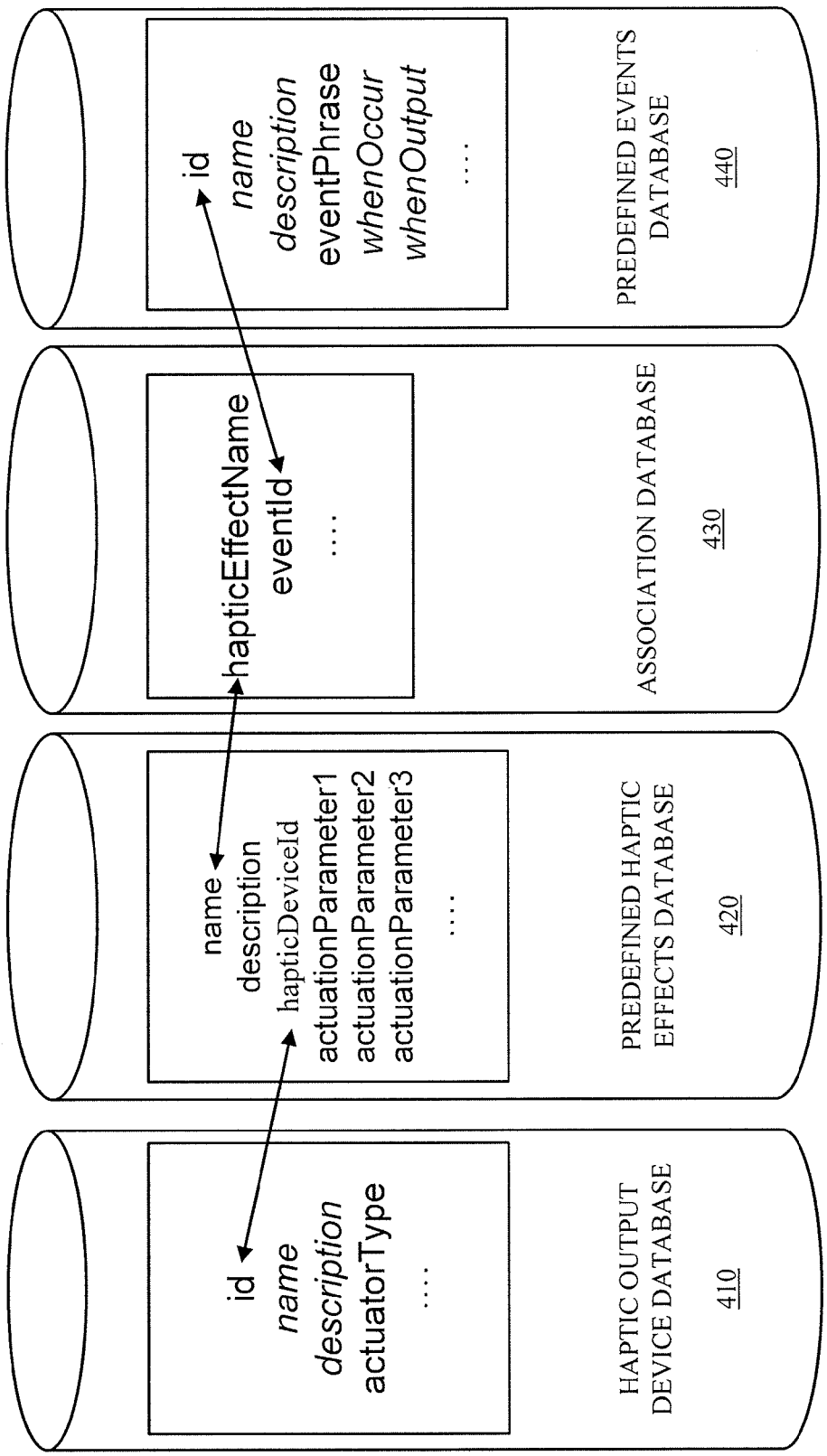
FIG. 4 illustrates a predefined haptic effect database, a predefined event database, and a predefined association database in accordance with an embodiment of the present invention.

Referring now to FIG. 4, this figure illustrates a haptic output database, a predefined haptic effect database, a predefined event database, and an association database in accordance with an embodiment of the present invention. In this embodiment, haptic output devices listed in the haptic output device database 410 are associated with predefined haptic effects from the predefined haptic effects database 420. Predefined haptic effects from the predefined haptic effects database 420 are associated with events from the predefined events database 440 through the association database 430. The predefined events database 440 shown in FIG. 4 is customized for predefined events that may occur while reading an eBook on an eReader. In other embodiments, the predefined events database 440 and/or the association database 430 is customized for one or more environments, such as for images or sounds or sensations. In still other embodiments one or more of these databases is generic with respect to its environment and, therefore, is not customized for a particular environment. The associations between predefined haptic effects and predefined events may be contained in one or more databases and/or one or more database tables. Numerous other variations are disclosed herein and others are within the scope of this disclosure.

In the embodiment shown in FIG. 4, the predefined haptic effects database 420 comprises a plurality of predefined haptic effects. Each predefined haptic effect in the database 420 has a name, an optional description, a haptic output device identification ("hapticDeviceId"), and one or more actuation parameters. The haptic output device database 410 comprises a unique identification ("id"), an optional name, an optional description, and a haptic output device type ("hapticDeviceType") for each haptic output device in the database. The haptic output device identification ("hapticDeviceId") for a predefined haptic effect in the predefined haptic effects database 420 corresponds to a unique identification ("id") from the haptic output device database 410.

In the embodiment shown in FIG. 4, the predefined events database 440 comprises a unique identification ("id"), an optional name, an optional description, an event phrase ("eventPhrase"), a description for when an occurrence of the event is deemed to occur ("when Occur"), and a description for when one or more haptic effects associated with the event should be output ("when Output"). The association database 430 comprises associations between the predefined haptic effects and the predefined events. For example, the association database 430 in FIG. 4 associates a "hapticEffectName" from the predefined haptic effects database 420 with an "id" of a predefined event from the predefined events database 440.

The eReader may use the information contained in the databases 410-440 to generate and/or output haptic effects as a user reads an eBook. For example, when a new page of an eBook is displayed on a display of the eReader, the content of the new page may be analyzed. In one embodiment, the eReader searches the text of the new page to determine whether any event in the predefined events database 440 having a when Occur value of "on Display" also has an eventPhrase that is present within the text of the new page. If the eReader determines that a predefined event in the predefined events database 440 has a when Occur value of "on Display" and has an eventPhrase that is found within the text of the new page, then the eReader uses the "id" of that predefined event to determine a name of a predefined haptic effect associated with the predefined event. For example, the eReader can query the association database 430 to determine a hapticEffectName associated with an eventId matching the determined "id" of the predefined event from the predefined events database 440.

Using the determined hapticEffectName from the association database 430, the eReader can query the predefined haptic effects database 420 to determine one or more predefined haptic effects from the predefined haptic effects database having a "name" that matches the determined "hapticEffectName" from the association database 430. In one embodiment, the eReader selects one or more of the predefined haptic effects from the predefined haptic effects database based on one or more haptic output device types that the eReader has. For example, a particular "name" in the predefined haptic effects database may be associated with three entries in the database. The first entry may have a "hapticDeviceId" corresponding to an "id" in the haptic output device database 410 for a "hapticDeviceType" of "ERM actuator". The second entry may have a "hapticDeviceId" corresponding to an "id" in the haptic output device database 410 for a "hapticDeviceType" of "linear resonant actuator". The third entry may have a "hapticDeviceId" corresponding to an "id" in the haptic output device database 410 for a "hapticDeviceType" of "piezoelectric actuator". If the eReader comprises a piezoelectric actuator, then the eReader may use the third entry in the predefined haptic effects database. For example, the eReader can use one or more of the haptic output device parameters specified for the "piezoelectric actuator" to generate and/or output the predefined haptic effect associated with the determined predefined event from the predefined events database 440.

In one embodiment, the "when Output" value for the predefined event is used to determining the timing for outputting one or more predefined haptic effects associated with the predefined event. For example, if the predefined event has a "when Output" value of 4000, then in one embodiment the eReader will output one or more predefined haptic effects associated with the predefined event after the text has been displayed for four seconds. In another embodiment, if the predefined event has a "when Output" value of "on Contact", then in an embodiment the eReader will output one or more predefined haptic effects associated with the predefined event when a user contacts a location of a touch-sensitive display of the eReader at a location corresponding to the text of the eventPhrase for the predefined event. Numerous other embodiments are disclosed herein and variations are within the scope of this disclosure.

Figure 5:
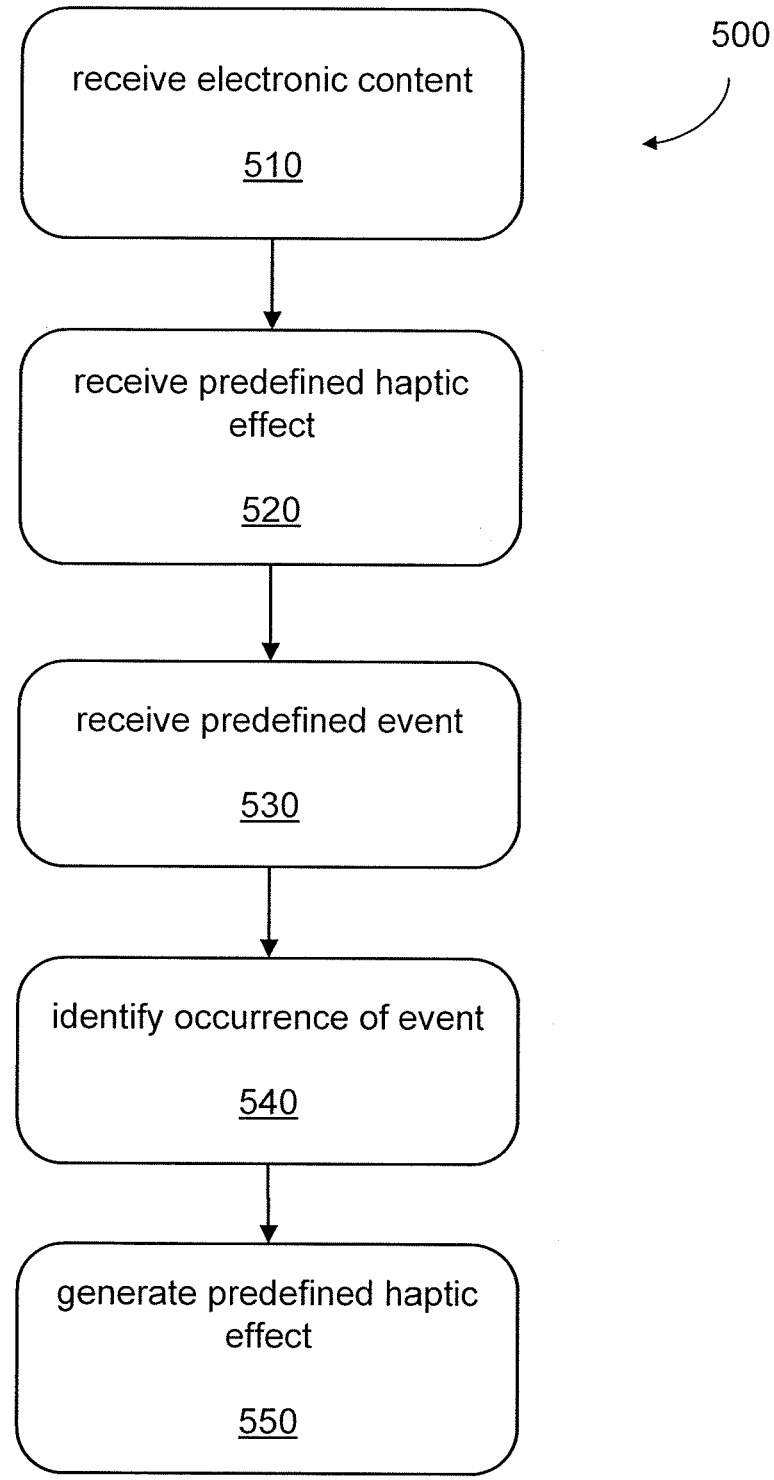
FIG. 5 illustrates a flow chart directed to a method of generating content- and/or context-specific haptic effects based at least in part on predefined events and predefined haptic effects in accordance with an embodiment of the present invention.

Illustrative Method of Generating Content- and/or Context-Specific Haptic Effects Based on Predefined Events and Predefined Haptic Effects Referring now to FIG. 5, this figure illustrates a flow chart directed to a method 500 of generating content- and/or context-specific haptic effects based at least in part on predefined events and predefined haptic effects in accordance with an embodiment of the present invention. The method 500 shown in FIG. 5 will be described with respect to the electronic device 200 shown in FIG. 2. In embodiments, the method 500 may be performed by one or more of the devices shown in system 300 in FIG. 3. For example, one or more of electronic devices 320-340 may perform method 500 in accordance with an embodiment of the present invention.

The method 500 begins in block 510 when the electronic device 200 receives electronic content 510. For example, referring to FIG. 3, tablet computer 320 may receive electronic content, such as an eBook or a web page, from web server 350 through network 310. In one embodiment, the electronic content is sent to the electronic device in response to a request sent by the electronic device 200 to another device, such as web server 350. In another embodiment, the electronic content may be pushed from another device to the electronic device 200. For example, web server 350 may send electronic content to mobile phone 340 without mobile phone 340 requesting the electronic content from the web server 350. In one embodiment, the processor 210 receives electronic content stored in memory 220. The processor 210 may receive electronic content from any number of storage devices (e.g., a hard disk drive, flash drive, cache, memory, and/or a data store), other electronic devices, and/or through a network interface that is in communication with the processor 210. The electronic content can be received by an application, an applet, a plug-in, or a script being executed by the processor 210 on the electronic device 200.

Referring back to method 500, once the electronic device 200 has received the electronic content 510, the method 500 proceeds to block 520. In block 520, the electronic device 200 receives a plurality of predefined haptic effects.

For example, referring to FIG. 3, tablet computer 320 may receive a plurality of predefined haptic effects from web server 350 through network 310. In one embodiment, a plurality of predefined haptic effects are sent to the electronic device 200 in response to a request sent by the electronic device 200 to another device, such as web server 350. In another embodiment, a plurality of predefined haptic effects may be pushed from another device to the electronic device 200. For example, web server 350 may send a plurality of predefined haptic effects to mobile phone 340 without mobile phone 340 requesting the a plurality of predefined haptic effects from the web server 350. In one embodiment, the processor 210 receives a plurality of predefined haptic effects stored in memory 220. The processor 210 may receive a plurality of predefined haptic effects from any number of storage devices (e.g., a hard disk drive, flash drive, cache, memory, and/or a data store), other electronic devices, and/or through a network interface that is in communication with the processor 210. The plurality of predefined haptic effects can be received by an application, an applet, a plug-in, or a script being executed by the processor 210 on the electronic device 200. In one embodiment, an application being executed on the electronic device 200 comprises the plurality of predefined haptic effects. In another embodiment, the plurality of predefined haptic effects are preloaded or embedded within the one or more hardware components of the electronic device 200 and the processor 210 receives the plurality of predefined haptic effects from one or more of the hardware components.

In one embodiment, the plurality of predefined haptic effects is embedded within the electronic content. For example, the plurality of predefined haptic effects may be embedded within an eBook or another electronic document. In another embodiment, a location for the plurality of predefined haptic effects is referenced by referenced by the electronic content. For example, the electronic content may specify a URL address corresponding to a location where a database containing the plurality of predefined haptic effects are stored. In this embodiment, the electronic device 200 may send a request to the database requesting the plurality of predefined haptic effects and receive the plurality of predefined haptic effects from the database. In various embodiments, a reference includes information usable by the electronic device 200 to locate and/or retrieve at least one predefined haptic effect. The electronic content can comprise a plurality of references that may be used to retrieve the plurality of predefined haptic effects. For example, a digital magazine may contain a reference to a first predefined haptic effect and another reference to a second predefined haptic effect.

Referring back to method 500, once the electronic device 200 receives the plurality of predefined haptic effects 520, the method 500 proceeds to block 530. In block 530, at least one predefined event is received. The predefined event may be associated with one or more of the plurality of predefined haptic effects. For example, a predefined event comprising a person smiling being displayed on a display may be associated with a predefined haptic effect from the plurality of predefined haptic effects that is configured to output a "happy" sensation. In one embodiment, an association between a predefined event and a predefined haptic effect may be embedded in and/or referenced by the predefined event or the predefined haptic effect. In some embodiments, the electronic device 200 receives one or more associations. For example, tablet computer 320 may receive an association between one or more predefined events and one or more predefined haptic effects from web server 350. In one embodiment, an association between a predefined event and a predefined haptic effect from the plurality of predefined haptic effects is dynamically generated. For example, if a predefined event is a sound of a rocket taking off being output then the electronic device 200 may determine one or more of the plurality of predefined haptic effects to associate with the predefined event. As an example, if one of the predefined haptic effects in the plurality of predefined haptic effects is configured to output a rumbling effect, then the electronic device 200 may dynamically associate the predefined rocket sound event with the predefined rumbling haptic effect.

Referring back to method 500, once a predefined event is received 530, the method 500 proceeds to block 540. In block 540, an occurrence of a predefined event is identified. For example, referring to FIG. 3, tablet computer 320 may analyze the portion of the received content, such as an eBook, digital magazine, audio, and/or video, to determine whether an occurrence of one or more of the predefined events has occurred. An occurrence of a predefined event may be identified by an application, an applet, a plug-in, or a script being executed by the processor 210 on the electronic device 200.

An occurrence of a predefined event can occur when the criteria of the parameters of the predefined event occurs. For example, if a predefined event comprises a particular icon being displayed on a display, then an occurrence of the predefined event may be identified when the particular icon is displayed on the display. The occurrence of a predefined event can be based at least in part on the received electronic content. For example, a predefined event may comprise a particular word no longer being displayed on the display. In this embodiment, the electronic device 200 may identify an occurrence of the predefined event when a particular page of an eBook containing the particular word is switched on the display to a new page that does not contain the particular word.

As another example, an application executing on the electronic device 200 may display an image containing a particular object (e.g., an image picturing a rocket). If a predefined event comprises an image of a rocket being displayed on the display of the electronic device, then the electronic device 200 may identify an occurrence of the predefined event when the rocket is displayed on the display. In some embodiments, the electronic content is dynamically analyzed to identify an occurrence of one or more of the predefined events. For example, if the electronic content comprises a live video feed—such as a live video from a user-facing camera associated with the electronic device 200—then the live video feed may be analyzed to determine a user's emotion. If the user's emotion corresponds to a predefined event then the electronic device 200 can identify an occurrence of the predefined event. For example, if the predefined event comprises a frown in a video stream, then the electronic device 200 may identify an occurrence of the predefined event when the user frowns.

In one embodiment, the identification of one or more predefined events is agnostic to the electronic content. For example, one or more predefined events may be used across any number of eBooks, digital magazines, and/or any other electronic content. As another example, in one embodiment, an event is the word "crash" or a variation of the word crash, such as "crashes", "crashing", etc. being displayed on a display. In this embodiment, if the electronic content comprises an eBook, then a portion of the eBook being displayed on a display can be analyzed to determine whether the portion of the eBook contains the word "crash" or a variation thereof. An occurrence of the predefined event can be identified when the portion of the eBook contains the word "crash" or a variation thereof. If a second eBook is received by the electronic device, then the portion of the second eBook being displayed on the display can be analyzed to determine whether the portion of the second eBook contains the word "crash" or a variation thereof. Thus, in this embodiment, the predefined event is not specific to a particular eBook, but rather is generic across any type of electronic content or one or more specific types of electronic content, such as eBooks. In other embodiments, a predefined event is specific to a particular item of electronic content. For example, a predefined event may be specific to a particular eBook or a particular electronic document.

Referring back to method 500, once the occurrence of a predefined event is identified 540, the method 500 proceeds to block 550. In block 550, the predefined haptic effect associated with the predefined event is generated. For example, one predefined event may be a particular icon being displayed on a display and the predefined event may be associated with a predefined haptic effect. In this embodiment, when the particular icon is displayed on the display, the predefined haptic effect is generated. Thus, in one embodiment, if a predefined event is a rocket icon being displayed on a display and the predefined event is associated with a predefined haptic effect configured to simulate a rocket taking off, then when a portion of an electronic document containing the rocket icon is displayed on the display of tablet computer 320 the predefined haptic effect configured to simulate a rocket taking off is generated by the tablet computer 320.

In one embodiment, the predefined haptic effect is generated when the occurrence of the predefined event occurs within at least a portion of the electronic content. For example, if a predefined event is a particular word being within an electronic document and the particular word is associated with a predefined haptic effect, then the predefined haptic effect may be generated when the electronic document containing the particular word is received and/or opened. In other embodiments, the predefined haptic effect associated with the predefined event may be generated when a portion of the electronic document containing the particular word is displayed on the display of an electronic device. In other embodiments, the predefined haptic effect may be generated at any number of times. For example, the predefined haptic effect may be generated when the electronic content containing the particular word is received, when the electronic content containing the particular word is opened, when the particular word within the electronic content is displayed, at a time before the particular word within the electronic content is displayed (e.g., if the electronic content is an eBook then the predefined haptic effect can be generated when the page before the page containing the particular word is displayed), at a time after the particular word within the electronic content is displayed (e.g., a determined time after the page of the eBook containing the particular word is displayed), and/or when the particular word within the electronic content is no longer displayed on the display.

In one embodiment, the processor 210 receives a signal from the touch-sensitive display 230 when a user contacts the touch-sensitive display 230 and the signal includes information associated with an input on, or a status of, the touch-sensitive display 230 such as the x, y location or pressure, or both, of a contact on the touch-sensitive display 230. In this embodiment, if the user is viewing a portion of the electronic content on the touch-sensitive display 230 of the electronic device 200 and if the processor 210 determines that the user is making a gesture in a direction towards the bottom of the display, then the processor 210 determines that the touch-sensitive display 230 should be updated to scroll down through the information in the electronic content. In this embodiment, an occurrence of a predefined event is determined to have occurred. In one embodiment, a signal is generated when the occurrence of the predefined event is determined to have occurred.

In another embodiment, a signal is generated before an occurrence of a predefined event is determined to have occurred. For example, as a user scrolls through the electronic content, the processor 210 may generate a signal as a predefined event becomes closer to occurring. In an embodiment, a signal is generated the first time an occurrence of a predefined event occurs. In another embodiment, a signal is generated each time a predefined event occurs.

In some embodiments, the processor 210 generates a single signal when the predefined event occurs. For example, in one embodiment, the processor 210 generates a signal configured to cause a haptic output device, such as haptic output device 240 or haptic output device 260, to output the predefined haptic effect associated with the predefined event. In other embodiments, the processor 210 generates two, three, or more signals. For example, in one embodiment, the processor 210 generates a first signal configured to cause a first haptic effect and a second signal configured to cause a second haptic effect. In some embodiments, the processor 210 generates a different signal for each predefined event that occurs. In various embodiments, the processor 210 generates one or more signals configured to cause the touch-sensitive display 230, the network interface 250, the haptic output device 240, the haptic output device 260, the speaker 270, other components of the device 200, other components of devices in communication with the device 200, or a combination thereof. For example, in one embodiment, the processor 210 generates a signal when the predefined event occurs where the signal is configured to cause a haptic output device in another device to cause a haptic effect. In one embodiment, the processor 210 sends the signal to the other device through the network interface 250.

In one embodiment, a generated signal includes a command for a device or component to perform a specified function, such as to output a haptic effect or transmit a message to a remote device. In another embodiment, a generated signal includes parameters which are used by a device or component receiving the command to determine a response or some aspect of a response. Parameters may include various data related to, for example, magnitudes, frequencies, durations, or other parameters that a haptic output device can use to determine a haptic effect, output a haptic effect, or both. For example, in one embodiment, the processor 210 generates a signal configured to cause haptic output device 240 to output the predefined haptic effect associated the predefined event. In such an embodiment, the signal may include a pressure parameter that the haptic output device 240 uses to determine the intensity of the predefined haptic effect to output. For example, according to one embodiment, the larger the pressure parameter the haptic output device 240 receives, the more intense the predefined haptic effect that is output.

In one embodiment, an intensity parameter is used by a haptic output device to determine the intensity of a haptic effect. In this embodiment, the greater the intensity parameter, the more intense the haptic effect that is output. In one embodiment, the intensity parameter is based at least in part on the rate of scrolling when an event occurs. Thus, according to one embodiment, a larger intensity parameter is sent to a haptic output device when a predefined event repeatedly occurs while the user is scrolling through the electronic content than when the predefined event occurs only once within with the electronic content or the portion of the electronic content being displayed. A signal may include data that is configured to be processed by a haptic output device, display, network interface, speaker, or other component of a device or in communication with a device in order to determine an aspect of a particular response.

In embodiments, the generated signal is output. For example, in one embodiment, the processor 210 generated a first signal configured to cause haptic output device 240 to output the generated haptic effect. In such an embodiment, the processor 210 outputs the signal to haptic output device 240. As another example, in an embodiment, the processor 210 generates a first haptic output signal configured to cause haptic output device 240 to output a first haptic effect and generated a second haptic output signal configured to cause haptic output device 260 to output a second haptic effect. In this embodiment, the processor 210 outputs the first signal to haptic output device 240 and the second haptic output signal to haptic output device 260.

In various embodiments, the processor 210 may output one or more generated signals to any number of devices. For example, the processor 210 may output one signal to the network interface 250. In one embodiment, the processor 210 may output one generated signal to the touch-sensitive display 230, another generated signal to the network interface 250, and another generated signal to the haptic output device 260. In other embodiments, the processor 210 may output a single generated signal to multiple components or devices. For example, in one embodiment, the processor 210 outputs one generated signal to both haptic output device 240 and haptic output device 260. In another embodiment, the processor 210 outputs one generated signal to haptic output device 240, haptic output device 260, and network interface 250. In still another embodiment, the processor 210 outputs one generated signal to both haptic output device 240 and haptic output device 260 and outputs a second generated signal to the touch-sensitive display 230.

As discussed above, the processor 210 may output one or more signals to the network interface 250. For example, the processor 210 may output a signal to the network interface 250 instructing the network interface 250 to send data to another component or device in communication with the electronic device 200. In such an embodiment, the network interface 250 may send data to the other device and the other device may perform a function such as updating a display associated with the other device or the other device may output a haptic effect. Thus, in embodiments of the present invention, a second device may output a haptic effect based at least in part upon an interaction with a first device in communication with the second device. In other embodiments, a second device may perform any number of functions such as, for example, updating a display associated with the second device or outputting a sound to a speaker associated with the second device based at least in part on an interaction with a first multi-pressure touch-sensitive input device 200.

In various embodiments, after the processor 210 outputs a signal to a component, the component may send the processor 210 a confirmation indicating that the component received the signal. For example, in one embodiment, haptic output device 260 may receive a command from the processor 210 to output a haptic effect. Once haptic output device 260 receives the command, the haptic output device 260 may send a confirmation response to the processor 210 that the command was received by the haptic output device 260. In another embodiment, the processor 210 may receive completion data indicating that a component not only received an instruction but that the component has performed a response. For example, in one embodiment, haptic output device 240 may receive various parameters from the processor 210. Based on these parameters haptic output device 240 may output a haptic effect and send the processor 210 completion data indicating that haptic output device 240 received the parameters and outputted a haptic effect.

General

While the methods and systems herein are described in terms of software executing on various machines, the methods and systems may also be implemented as specifically-configured hardware, such as field-programmable gate array (FPGA) specifically to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A non-transitory computer-readable medium comprising one or more software applications configured to be executed by a processor, the one or more software applications configured to cause the processor to:
   receive electronic content;
   receive a plurality of predefined haptic effects, the plurality of predefined haptic effects separate and independent from the electronic content;
   receive a predefined event, the predefined event separate and independent from the electronic content;
   receive an association between at least one predefined haptic effect from the plurality of predefined haptic effects and the predefined event;
   associate the predefined event with the electronic content;
   present a portion of the electronic content on a display;
   detect an occurrence of the predefined event based on the presented portion of the electronic content on the display; and
   in response to the detection of the occurrence of the predefined event in the presented portion of the electronic content, generate the at least one predefined haptic effect associated with the predefined event.

2. The non-transitory computer-readable medium of claim 1, wherein the electronic content is received from a storage device or by requesting the electronic content from a remote device.

3. The non-transitory computer-readable medium of claim 1, wherein the plurality of predefined haptic effects comprises a library, a database, or an electronic list of predefined haptic effects.

4. The non-transitory computer-readable medium of claim 1, wherein the one or more software applications are further configured to cause the processor to receive the plurality of predefined haptic effects by querying a database for the plurality of predefined haptic effects.

5. The non-transitory computer-readable medium of claim 1, wherein the one or more software applications are further configured to cause the processor to receive the plurality of predefined haptic effects by retrieving the plurality of predefined haptic effects from a storage device or by requesting the plurality of predefined haptic effects from a remote device.

6. The non-transitory computer-readable medium of claim 1, wherein the one or more software applications are further configured to cause the processor to determine the association between the at least one predefined haptic effect from the plurality of predefined haptic effects and the predefined event by analyzing at least the portion of the electronic content.

7. The non-transitory computer-readable medium of claim 1, wherein the one or more software applications are further configured to cause the processor to determine the association between the at least one predefined haptic effect from the plurality of predefined haptic effects and the predefined event by querying a database for the association.

8. The non-transitory computer-readable medium of claim 1, wherein the one or more software applications are further configured to cause the processor to determine the association between the at least one predefined haptic effect from the plurality of predefined haptic effects and the predefined event by retrieving the association from a storage device or by requesting the association from a remote device.

9. The non-transitory computer-readable medium of claim 1, wherein the one or more software applications are further configured to cause the processor to:
receive the predefined event from a storage device or requesting the association from a remote device.

10. The non-transitory computer-readable medium of claim 1, wherein the one or more software applications are further configured to cause the processor to:
receive a library, a database, or an electronic list comprising the predefined event.

11. The non-transitory computer-readable medium of claim 1, wherein the one or more software applications are further configured to cause the processor to:
query a database for the predefined event.

12. The non-transitory computer-readable medium of claim 1, wherein the predefined event comprises at least one predefined word being displayed on a display, and wherein the one or more software applications are further configured to cause the processor to detect the predefined event by determining that the presented portion of the electronic content comprises the at least one predefined word.

13. The non-transitory computer-readable medium of claim 1, wherein the predefined event comprises an image comprising a predefined object being displayed on a display, and wherein the one or more software applications are further configured to cause the processor to detect the predefined event by determining that the presented portion of the electronic content comprises the image comprising the predefined object.

14. The non-transitory computer-readable medium of claim 1, wherein the predefined event comprises a sound corresponding to a predefined sound being output to a speaker, and wherein the one or more software applications are further configured to cause the processor to detect the predefined event by determining that the presented portion of the electronic content corresponds to the sound corresponding to the predefined sound being output.

15. The non-transitory computer-readable medium of claim 1, wherein the predefined event comprises a sound corresponding to a predefined sound being output to a speaker, and wherein the one or more software applications are further configured to cause the processor to detect the predefined event by determining that the presented portion of the electronic content corresponds to the sound corresponding to the predefined sound being output.

16. The non-transitory computer-readable medium of claim 1, wherein the one or more software applications are further configured to cause the processor to generate the at least one predefined haptic effect associated with the predefined event by generating a signal configured to cause a haptic output device to output the predefined haptic effect and outputting the signal to the haptic output device.

17. The non-transitory computer-readable medium of claim 1, wherein the one or more software applications are further configured to cause the processor to generate the at least one predefined haptic effect by generating a first haptic output signal, the first haptic output signal configured to cause a first haptic output device to output at least a first portion of the predefined haptic effect and generating a second haptic output signal, the second haptic output signal configured to cause a second haptic output device to output at least a second portion of the predefined haptic effect.

18. The non-transitory computer-readable medium of claim 1, wherein the predefined event is not associated with the predefined haptic effect when received.

19. The non-transitory computer-readable medium of claim 1, wherein the predefined event is generic across different types of electronic content.

20. The non-transitory computer-readable medium of claim 1, wherein the one or more software applications are further configured to cause the processor to detect the predefined event without user interaction with the presented portion of the electronic content on the display.

21. The non-transitory computer-readable medium of claim 1, wherein the one or more software applications are further configured to cause the processor to detect the predefined event without requiring user interaction with the display.

22. The non-transitory computer-readable medium of claim 1, wherein the one or more software applications are further configured to cause the processor to detect the predefined event when the presented portion of the electronic content comprises a particular word.

23. The non-transitory computer-readable medium of claim 1, wherein the plurality of predefined haptic effects and the predefined event are configured to be usable with the electronic content and other electronic content.

24. The non-transitory computer-readable medium of claim 1, wherein the plurality of predefined haptic effects, the predefined event, and the association between the at least one predefined haptic effect and the predefined event are not specific to the electronic content.

25. The non-transitory computer-readable medium of claim 1, wherein the association between the at least one predefined haptic effect and the predefined event is separate and independent from the electronic content.

26. The non-transitory computer-readable medium of claim 1, wherein the predefined event and the association between the at least one predefined haptic effect and the predefined event are embedded within the plurality of predefined haptic effects.

27. An electronic device, comprising:
a display;
a memory;
a haptic output device; and a processor in communication with the display, the memory, and the haptic output device, the processor configured to:
receive electronic content;
receive a plurality of predefined haptic effects, the plurality of predefined haptic effects separate and independent the electronic content;
receive a predefined event, the predefined event separate and independent from the electronic content;
receive an association between at least one predefined haptic effect from the plurality of predefined haptic effects and the predefined event;
associate the predefined event with the electronic content;
present a portion of the electronic content on the display;
detect an occurrence of the predefined event based on the presented portion of the electronic content; and
in response to detection of the occurrence of the predefined event, generate the at least one predefined haptic effect associated with the predefined event.

28. The electronic device of claim 27, wherein the electronic device comprises at least one of a mobile phone, an e-reader, or a tablet computer.

29. The electronic device of claim 27, wherein the electronic content comprises at least one of an electronic document, a digital book, or a media file.

30. The electronic device of claim 27, wherein at least one of the electronic content, one or more of the plurality of predefined haptic effects, the association, or the predefined event is received from the memory.

31. The electronic device of claim 27, wherein the plurality of predefined haptic effects is a database, a library, or an electronic list of predefined haptic effects.

32. The electronic device of claim 27, further comprising a network interface in communication with the processor, and wherein at least one of the electronic content, one or more of the plurality of predefined haptic effects, the association, or the predefined event is received from another electronic device through the network interface.

33. The electronic device of claim 27, wherein the predefined haptic effect is generated by generating a haptic output signal, the haptic output signal configured to cause the haptic output device to output the predefined haptic effect, and outputting the haptic output signal to the haptic output device.

34. The electronic device of claim 27, wherein the haptic output device comprises a piezo-electric actuator, a rotary motor, or a linear resonant actuator.

35. The electronic device of claim 27, wherein the predefined haptic effect comprises at least one of a vibration, a friction, a texture, or a deformation.

36. The electronic device of claim 27, wherein the display comprises a touch-sensitive input device, and the processor is further configured to:
receive input from the touch-sensitive input device; and
update the display with the portion of the electronic content based at least in part on the received input.

37. A method, comprising:
receiving, by an electronic device, electronic content;
receiving, by the electronic device, a plurality of predefined haptic effects, the plurality of predefined haptic effects separate and independent from the electronic content;
receiving, by the electronic device, a predefined event, the predefined event separate and independent from the electronic content;
receiving an association between at least one predefined haptic effect from the plurality of predefined haptic effects and the predefined event;
associating the predefined event with the electronic content;
presenting a portion of the electronic content;
detecting an occurrence of the predefined event based on the presented portion of the electronic content; and
in response to detecting the occurrence of the predefined event, generating, by the electronic device, the predefined haptic effect associated with the predefined event.

* * * * *